United States Patent [19]

Owada et al.

[11] Patent Number: 5,857,038
[45] Date of Patent: Jan. 5, 1999

[54] IMAGE PROCESSING APPARATUS AND METHOD FOR SYNTHESIZING FIRST AND SECOND IMAGE DATA

[75] Inventors: Mitsuru Owada, Yokohama; Yoshitake Nagashima, Chigasaki; Takeo Kimura, Yokohama, all of Japan

[73] Assignee: Canon Kabushiki Kaisha, Tokyo, Japan

[21] Appl. No.: 267,403

[22] Filed: Jun. 29, 1994

[30] Foreign Application Priority Data

Jun. 29, 1993 [JP] Japan .................................... 5-159548
Oct. 27, 1993 [JP] Japan .................................... 5-269088
Apr. 28, 1994 [JP] Japan .................................... 6-092488

[51] Int. Cl.$^6$ ............................................ H04N 1/387
[52] U.S. Cl. ........................... 382/284; 358/450; 358/540
[58] Field of Search .................... 358/538, 539, 358/540, 450, 453, 458, 447, 448; 382/210, 268, 284; 380/54; H04N 1/387

[56] References Cited

U.S. PATENT DOCUMENTS 4,504,084  3/1985  Jauch ........................................ 380/54
4,949,381  8/1990  Pastor ....................................... 380/54
4,985,930  1/1991  Takeda et al. ........................... 358/452
5,028,993  7/1991  Kobori et al. ........................... 358/540
5,257,119  10/1993 Funada ..................................... 358/438
5,360,235  11/1994 Drummeter et al. ..................... 380/54

Primary Examiner—Kim Yen Vu
Attorney, Agent, or Firm—Fitzpatrick, Cella, Harper & Scinto

[57]     ABSTRACT

An apparatus and method for adding information to image data of a multicolor image and a monochromatic image includes the performing of a dispersion conversion on the spectrum of additional information to be added to the image data by multiplying a code sequence of a PN sequence generator by the additional data which is inputted from an input terminal and converted into serial data in a P/S converter. At this time, the data sequence transmitted from an image signal processor to a printer engine 107 is converted by a scan converter to correspond to the spatial axis for dispersion. The converted data sequence is added to the output from an adder by another adder 110, and reconverted to the original scan by a scan inverter.

12 Claims, 36 Drawing Sheets

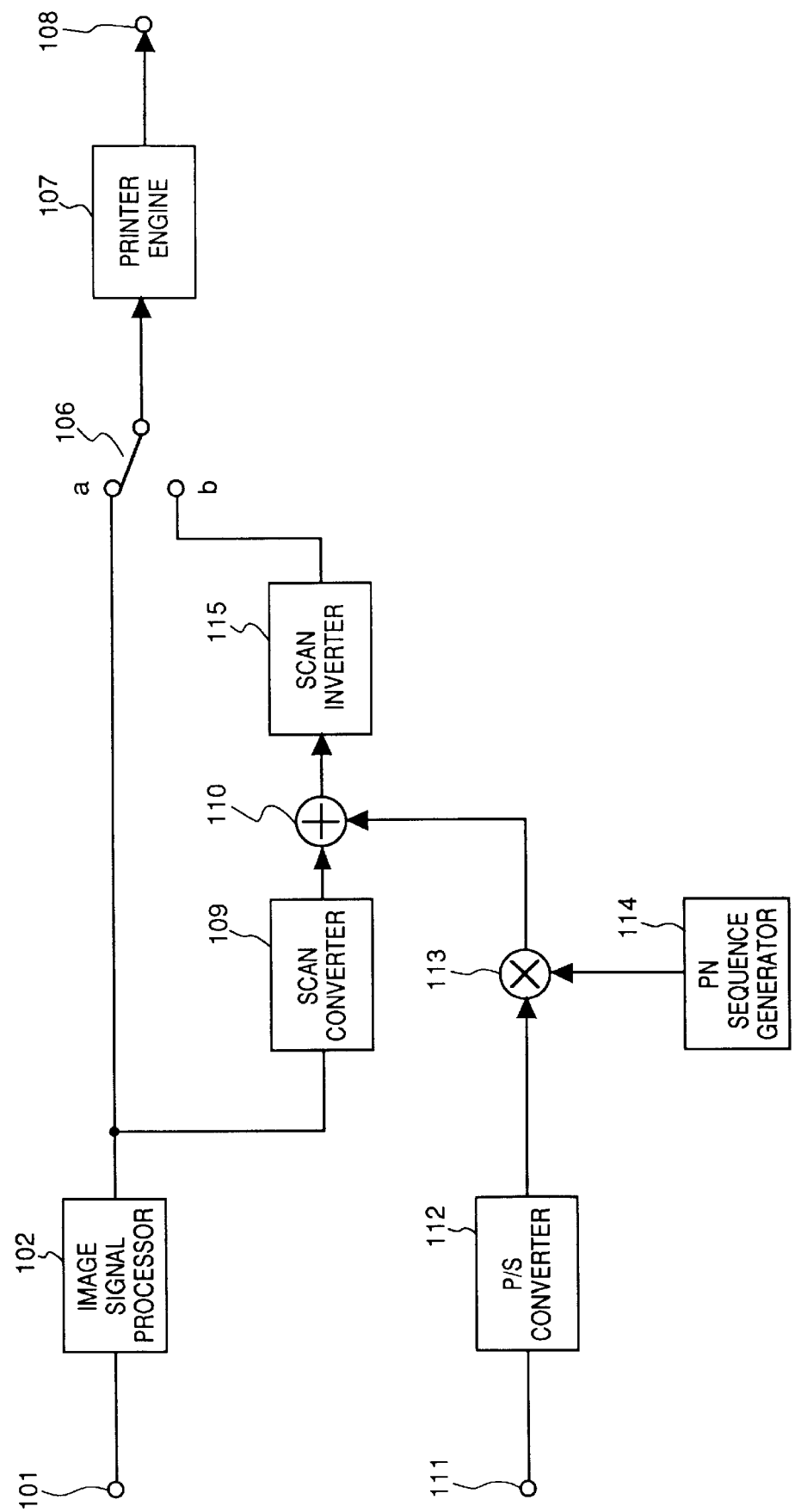

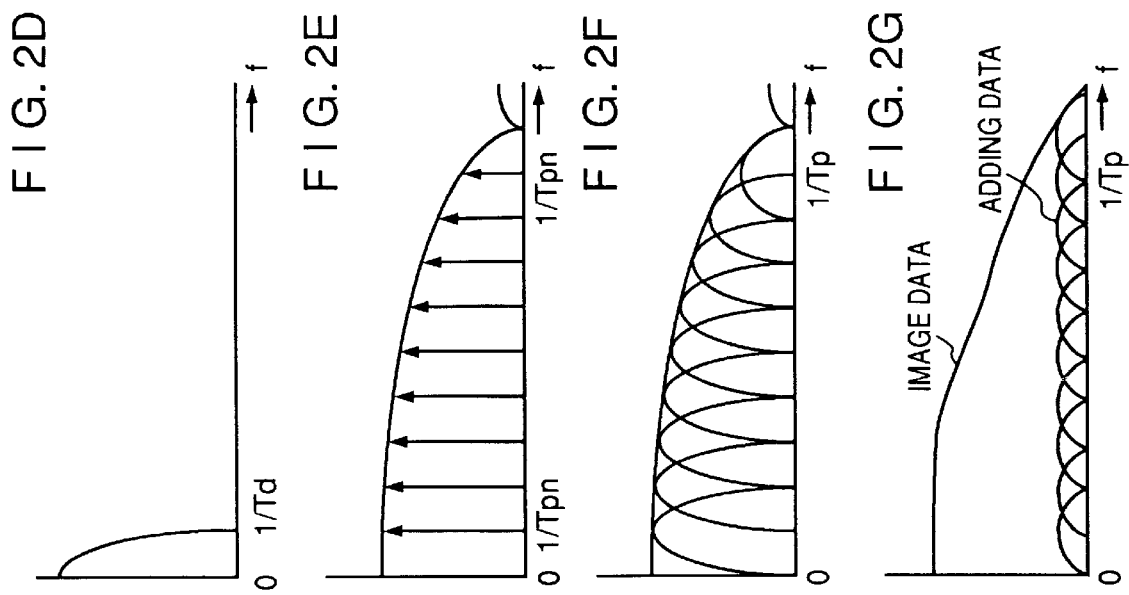
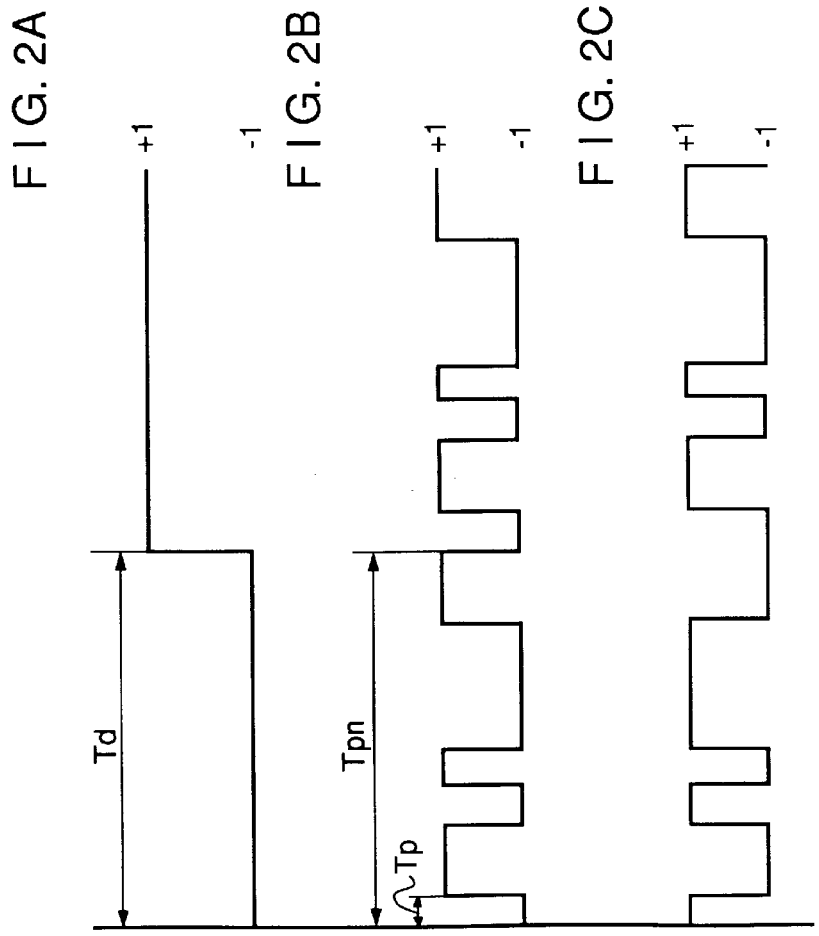

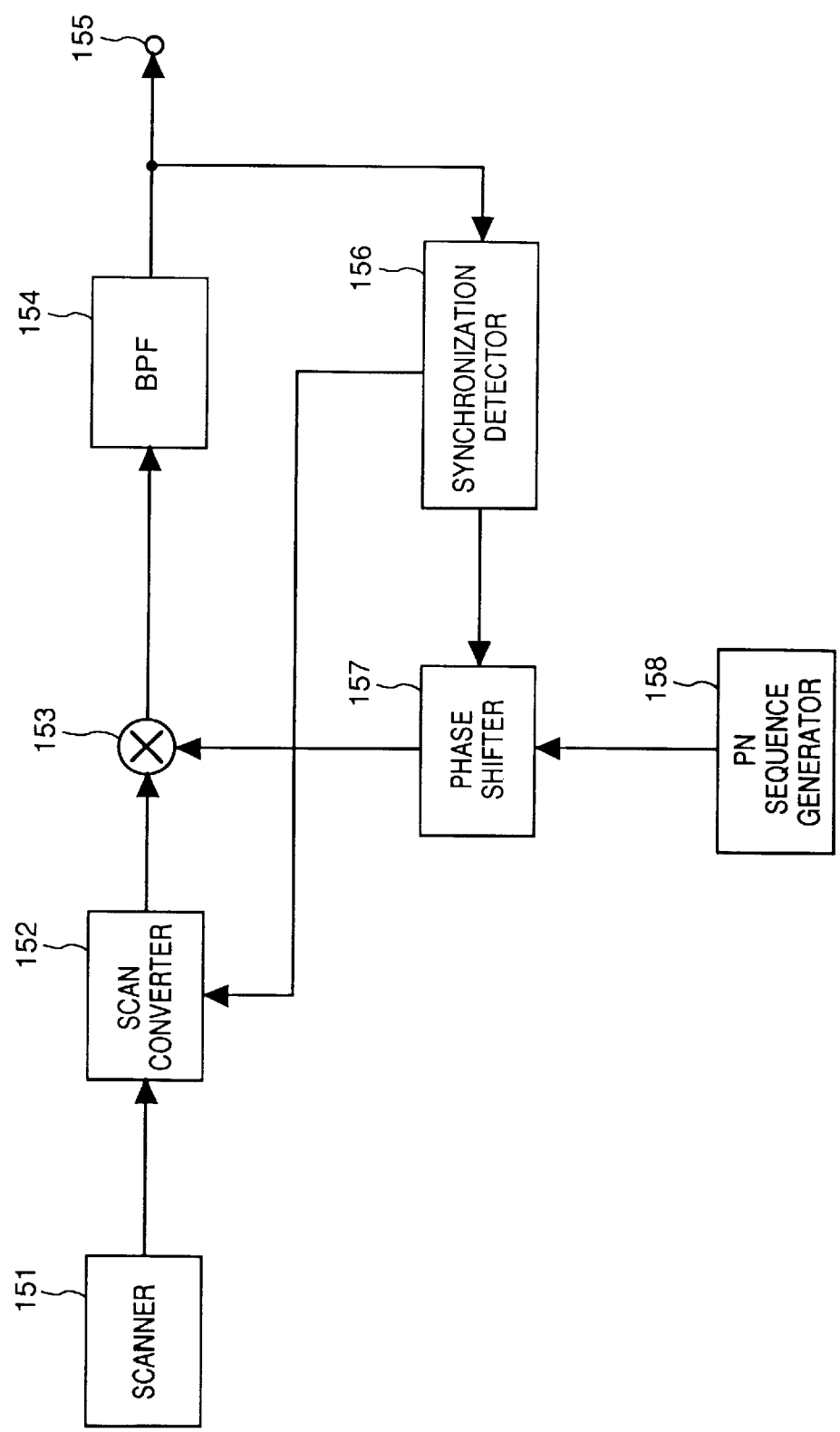

FIG. 30

IMAGE PROCESSING APPARATUS AND METHOD FOR SYNTHESIZING FIRST AND SECOND IMAGE DATA

BACKGROUND OF THE INVENTION

The present invention relates to an image processing apparatus and method capable of adding information to image data.

There are many cases (such as in the prevention of forgeries) in which additional information should be added to basic image data but which is imperceptible to human eyes. Conventionally, when additional information is added and multiplexed to image data of an original, the original image data deteriorates considerably. To solve the above problem, U.S. Pat. No. 5,257,119, which utilizes the visual characteristic of human eyes, adds the additional information to a yellow component of an original multicolor image. The added information will be imperceptible due to the characteristics of the human eye.

However, there are cases in which the added information is needed to be extracted or restored. In order to be able to extract and decode the added information from an output image generated by conventional techniques, additional data with a considerably large value needs to be added and modulated in the multiplexing processing. The modulation causes the image quality to deteriorate, while it provides the advantage that the added information is imperceptible to human eyes.

Since the conventional technique utilizes a particular color which is difficult to discriminate by human eyes, the multiplexing process is practically applied only to a multicolor image, but not to a monochromatic image.

Furthermore, in the case where the information adding processing is applied to a multi-color image and then the output image is post-processed with such a color conversion process, the added information is converted to a color which is of high perceptibility. Thus, it becomes unpractical.

Furthermore, the added information is easily read by a third person, and this is inconvenient when the added information is confidential.

Still further, there are additional image pattern which cannot be added and/or separated with the conventional techniques. Thus, it is impossible to provide a stable multiplexing or addition operation.

SUMMARY OF THE INVENTION

Accordingly, it is an object of the present invention to solve the above problems.

Another object of the present invention is to prevent additional information from being perceptible when it is added to an input image.

An image processing apparatus comprising: first generating means for generating first image data representing an original; second generating means for generating second image data representing additional information; converting means for converting a spatial spectrum of the second image data onto the original image space; and synthesizing means for synthesizing the converted second image data with the first image data.

Another aspect is attained by an image processing method comprising the steps of: generating first image data representing an original; generating second image data representing additional information; converting a spatial spectrum of the second image data onto the original image space; and synthesizing the converted second image data with the first image data.

A further object of the present invention is to provide an image processing apparatus and method capable of extracting information from the image where the information is added so as to be imperceptible.

An image processing apparatus comprising: output means for outputting first image data representing an original with which second image data is synthesized so as to be difficult to discriminate with human eyes; and extracting means for extracting the second image data from the first image data.

Another aspect is attained by an image processing method comprising the steps of: inputting first image data representing an original with which second image data is synthesized so as to be difficult to discriminate with human eyes; and extracting the second image data from the first image data.

Another object of the present invention is to reduce the deterioration of the image when information is added thereto.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 1 is a diagram illustrating the construction of the apparatus of an embodiment according to the invention;

FIGS. 2A to 2G are diagrams for explaining the spectrum conversion of the embodiment;

FIG. 3 is a diagram illustrating the construction of the decoder in the embodiment;

FIG. 30 is a diagram illustrating the adding processing operation of adding the additional data in accordance with the thirteenth embodiment;

DESCRIPTION OF THE PREFERRED EMBODIMENTS

Figure 4:
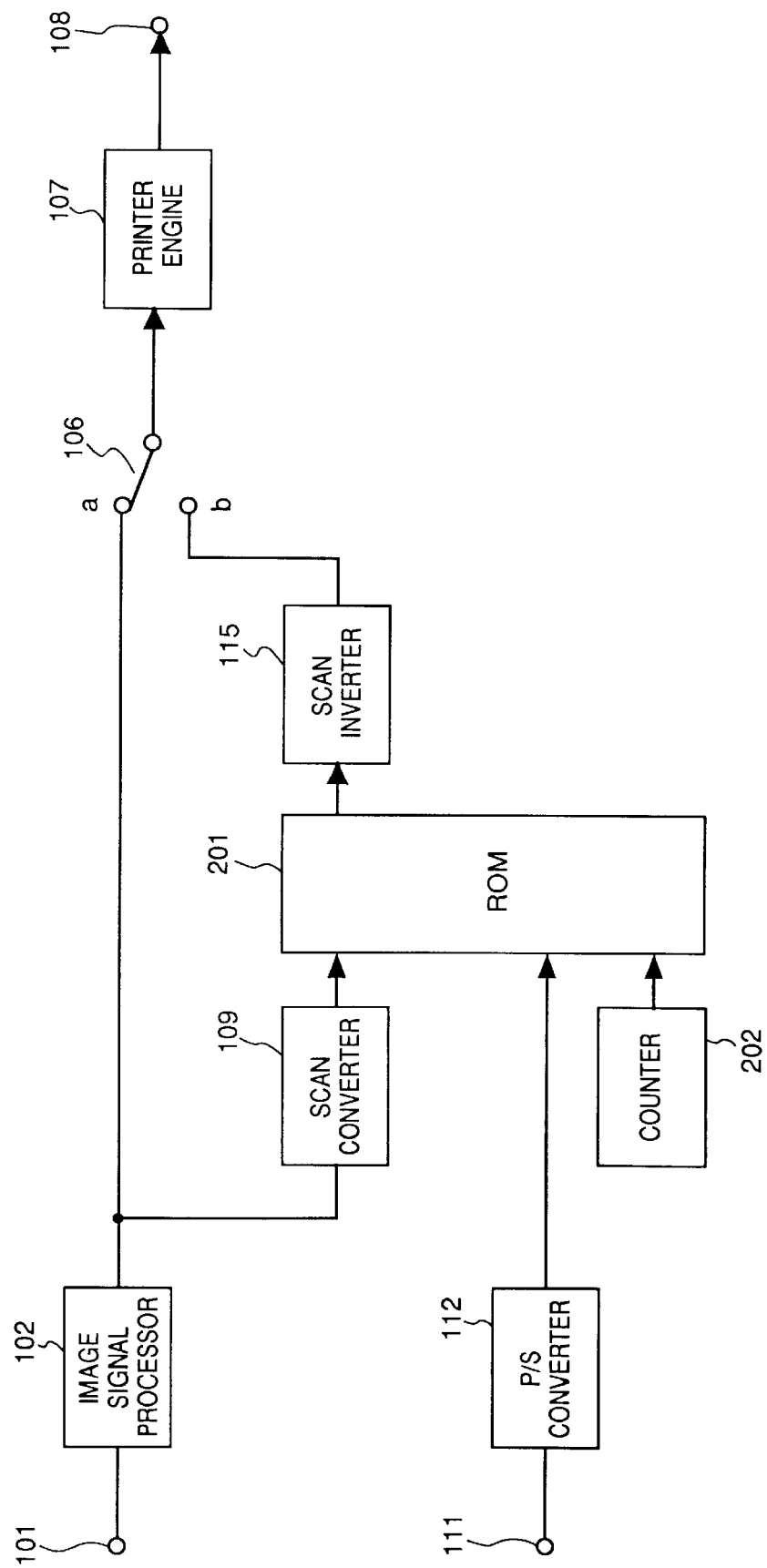
FIG. 4 is a diagram for explaining the apparatus of a second embodiment according to the invention.

Preferred embodiments of the present invention will now be described in detail in accordance with the accompanying drawings.

[The First Embodiment]

FIG. 1 is a schematic diagram illustrating the apparatus of a first embodiment according to the invention.

In FIG. 1, numeral 101 denotes an input terminal for inputting image data, numeral 102 is an image signal processor for performing a predetermined image processing operation on the image data inputted from the input terminal 101, and numeral 106 is a switcher for switching terminals to a printer engine 107 which forms and outputs image data. Numeral 108 is an output terminal from the printer engine 107.

Numeral 109 is a scan converter for converting or changing a sequence order of an image data from the image signal processor 102, numeral 110 is an adder for adding input data from the scan converter 109 to data inputted from a multiplier 113, numeral 111 is an input terminal at which additional data is applied to the input image data, and numeral 112 is a parallel-serial (P/S) converter for converting the additional data from parallel to serial data.

Numeral 113 is a multiplier for multiplying data from the P/S converter by data from a PN (pseudo noise) sequence generator 114. Numeral 114 is a PN sequence generator for generating a sequence of codes having a characteristic of strong auto-correlation in an image space. Numeral 115 is a scan inverter for de-converting or restoring the output from the adder 110 to the sequence of the original data.

The operation of the embodiment having the above structure will be described below.

Image data is inputted to the image signal processor 102 from the input terminal 101. In the image signal processor 102, the input image data are subjected to various pre-processes such as color conversion in accordance with the characteristic of the printer engine 107. The output of the image signal processor 102 is applied to terminal a of the switcher 106 as well as to the scan converter 109. The switcher 106 serves to control whether or not additional data is added to the original image. When the switcher 106 connects to the terminal a, the output data of the image signal processor 102 is directly routed to the printer engine 107.

The printer engine 107 forms an image in accordance with image data inputted thereto, and outputs the formed image from the output terminal 108. When the additional data is not to be added to the image, the switcher 106 is controlled to connect to the terminal a, and the above operation is performed.

Then, a case where the additional data is added to the original image will be described. As described above, the output of the image signal processor 102 is also inputted into the scan converter 109 which coverts the sequence of image data from the image signal processor 102 and outputs it onto an input terminal of the adder 110.

The additional data is inputted via the input terminal 111 in a parallel format. The inputted additional data is converted to a serial sequence by the P/S converter 112, and inputted into an input terminal of the multiplier 113. The other input terminal of the multiplier 113 is supplied with a pseudo noise sequence (e.g., a sequence of codes having a strong auto-correlation in an image space) from the PN sequence generator 114. The multiplier 113 multiplies these two signals, and outputs the result to the adder 110. Multiplication by the multiplier 113 serves as a spectrum conversion.

The spectrum conversion of the embodiment is described with reference to FIGS. 2A–2G.

An example of the additional data sequence in a serial format is illustrated in FIG. 2A. If the minimum pulse width of the signal sequence is denoted as Td, the signal sequence exhibits the spectrum as shown in FIG. 2D. The band width of the sequence is 2 Bp (=$2 \cdot 1/T_d$).

A sequence of codes supplied by the PN sequence generator 114 is a code sequence to diffuse the spectrum and satisfies the following conditions:

(1) It has a rate faster than the bit rate of the above data sequence having the pulse width Td;

(2) It has a uniform spectrum within the range Bp; and (3) It has a periodicity in order to obtain a synchronization during a decoding operation phase.

As a typical example of a PN sequence which meets the above conditions, codes in the M sequence is provided. The spectrum of such a PN sequence having the minimum pulse width Tp and the periodic interval Tpn as shown in FIG. 2B is illustrated in FIG. 2E.

Accordingly, a multiplication made at the multiplier 113 of the signals as shown in FIGS. 2A and 2B, serves as a convolution of the signals, as shown in FIGS. 2D and 2E, to produces a signal which has the spectrum as shown in FIG. 2F, which spectrum diffuses over the entire range of Bp (Bp=1/Tp). In order to add the signal data of FIG. 2C to the original image data by the adder 110, Tp is determined to be as long as the image data clock length multiplied by an integer.

The adding operation, in the case where the original image data is a raster-scanned data sequence, will result in a diffusion of the additional data in the rastering direction in the printed image. This diffusion plays the same role as the operation of determining the horizontal axis of FIG. 2G graph with respect to a horizontal spatial axis. This means that the additional (adding) data is diffused over the horizontal spatial frequencies, and the additional data appears as noise on the output image. Reviewing this from the point of view of spectrum power, since the power of the original signal (referred to as "Bd" hereinafter) is considered as diffused in the band Bp, the power of the diffused signal is reduced to Bd/Bp. Accordingly, setting the ratio Bp/Bd to be large will have a considerably large effect on reducing of the power of the reproduced image.

The embodiment described above applies to only one dimensional (horizontal) diffusion. However, the embodiment can be expanded to apply to two dimensional (horizontal and vertical) diffusion.

The scan converter 109 and scan inverter 115 shown in FIG. 1 are converters for this purpose. The scan inverter 115 converts the data sequence which is transferred from the image signal processor 102 to the printer engine 107 in the spatial axis directions where the above diffusion is performed. The converted data sequence is added to the output from the multiplier 113 in the adder 110, and the added result is reinstated to the original sequence of image data by the scan inverter 115.

The output of the scan inverter 115 is routed to the terminal b of the switcher 106. Where the additional data is added to the original image data, the terminal b of the switcher 106 is selected as an input of the engine 107. As a consequence, the data from the scan inverter 115 is applied to the printer engine 107, and then outputted from the output terminal 108.

The conversion of image data to two dimensional directions by the scan converter 109 is realized as one method by dividing pixel data of the original image into blocks, each of which is composed of 16×16 pixels in the horizontal and vertical directions. In this case, periodic intervals of the PN sequence needs to be set to correspond to this block arrangement, that is the 16×16 pixel arrangement.

If the additional data which is of one bit length is added to a PN sequence which has a 256 clock interval, the value of ratio Bp/Bd becomes 256, and the power of each spatial frequency in the spectrum is reduced to $1/256$ of the original.

With the above processing, the additional data can be added without deterioration of image quality.

Next, a process to discriminate or decode the original additional data from the output will be described with reference to FIG. 3.

In FIG. 3, numeral 151 denotes a scanner for reading an image, numeral 152 is a scan converter for converting a data sequence of the read image, numeral 153 is a multiplier, numeral 154 is a band pass filter (referred to as "BPF" hereinafter), numeral 155 is a terminal where decoded additional data is outputted, numeral 156 is a synchronization detector, numeral 157 is a phase shifter, and numeral 158 is a PN sequence generator for generating a PN sequence which is the same as the PN sequence generator 114 shown in FIG. 1.

With the above structure, the CCD sensor of the scanner 151 reads a paper on which an original image (to which additional data has been added) is printed by the printer engine 107 shown in FIG. 1, and outputs image data to the scan converter 152. The scan converter 152 converts the order of the data sequence so that the space of the image data is the same as that of the data addition operation described in connection with FIG. 1, and outputs it to the multiplier 153.

The multiplier 153 further inputs a signal from the phase shifter 157, and restores the output data of the converter 152 to the original spectrum by multiplying the output data by the signal from the shifter 157. The output of the multiplier 153 is applied to the BPF 154 so that any unnecessary spectrum may be cut-off and a desired signal may be extracted. Thus the original additional data is outputted from the output terminal 155.

The input signal to the multiplier 153 from the phase shifter 157 comprises a PN sequence signal which is the same as that in the previous multiplication or adding operation, and the PN sequence generator 158 used for the multiplication is used. The phase shifter 157 is provided to obtain a synchronization with the periodic interval of the PN sequence. The phase shifter 157 which may be realized by an FIFO buffer performs a variable delay operation, and is controlled by the output of the synchronization detector 156. The synchronization detector 156 determines whether the PN code sequence is in synchronization or non-synchronization from the output result of the BPF 154. Controlling the synchronization of block division operation during the scan conversion operation as well as the synchronization of the PN code produces a synchronized state.

A synchronization point where the output of the BPF 154 exhibits a maximum value can be searched by shifting the phase of the PN code sequence by the phase shifter 157 or by shifting, where the scan converter 152 is performing the block division operation, the phase of the division. In this regard, if the block division in the scan converter is synchronized with the PN code sequence, providing a synchronization of the converter 152 with the generator 158 makes the phase shifter 157 unnecessary.

Thus, the additional information can be extracted with the above control operations.

Consequently, the first embodiment above described can add additional information to image data of a multicolor image or a monochromatic image without deterioration of image quality. Moreover, the additional information can be easily extracted, and this scheme can be used for various purposes.

[Second Embodiment]

A second embodiment according to the invention will be described with reference to FIG. 4.

FIG. 4 is a schematic view of the apparatus of the second embodiment according to the embodiment. In FIG. 4, the elements which are identical to those in FIG. 1 have the same reference numerals, and the description is not needed.

In FIG. 4, numeral 201 denotes a ROM to which an output of the scan converter 109, an output of the P/S converter 112 and an output of a counter 202 are inputted as an address input, and which outputs data to the scan inverter 115. The ROM is provided in this second embodiment in order replace the adder 110, multiplier 113 and PN sequence generator 114 of the first embodiment.

Numeral 202 is the counter which is operated at the clock Tp which is the same operation clock of the PN sequence generator 114 in the first embodiment, and which performs a cyclic counting operation at a periodic interval of a PN code sequence multiplied by an integer. The counter 202 generates the interval of the PN sequence, and the P/S converter 112 generates additional data. ROM 201 has been stored in advance with results of adding various additional data and various image data from the scan converter 109. Thus, ROM 201 can function as the adder 110, the multiplier 113 and the PN sequence generator 114 of the first embodiment.

As described above, according to the second embodiment, the additional information can be added to the image data of a multicolor image and a monochromatic image without image deterioration.

[Third Embodiment]

Figure 5:
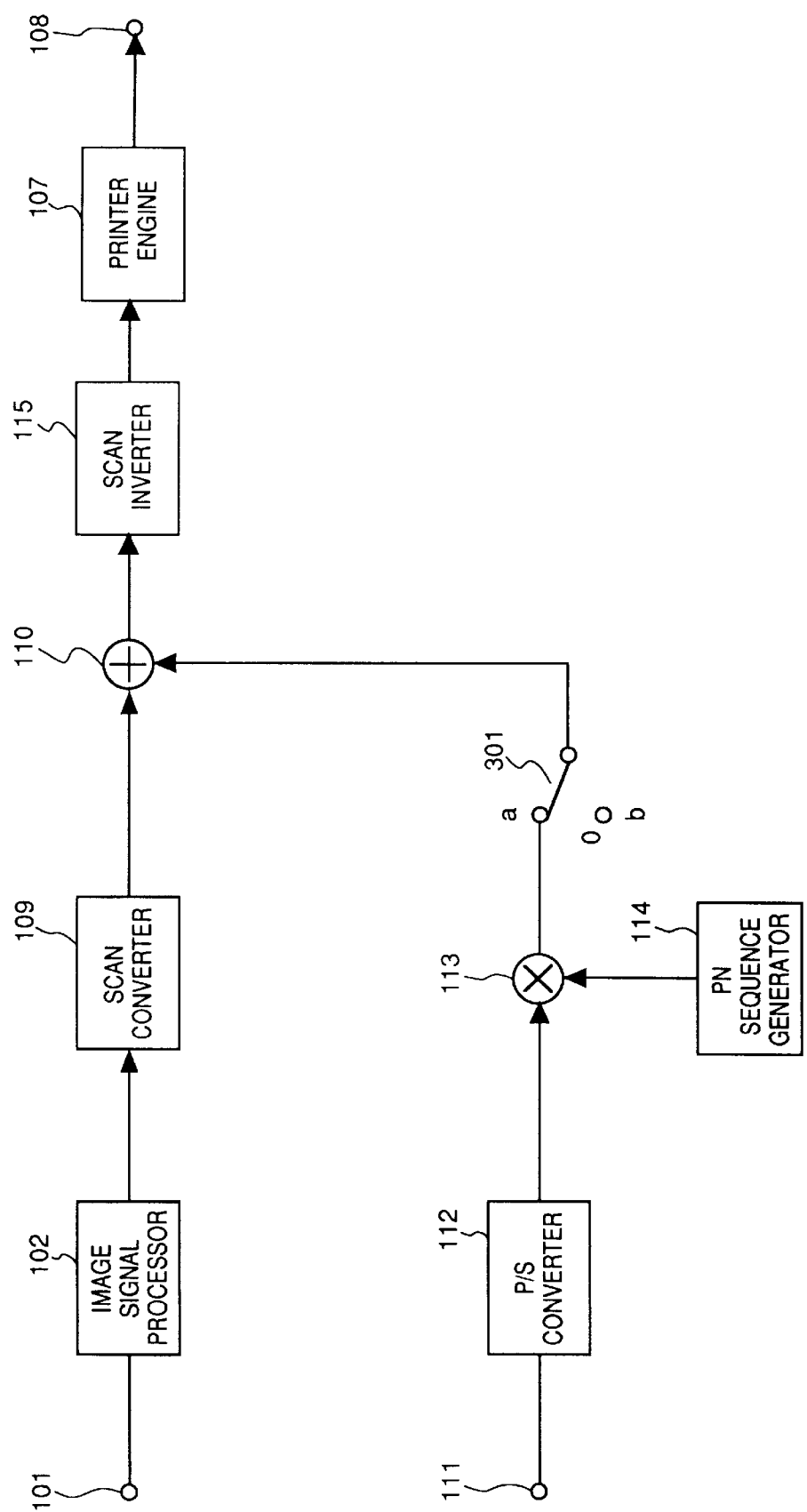
FIG. 5 is a diagram for explaining the apparatus of a third embodiment according to the invention.

A third embodiment according to the invention is described with reference to FIG. 5. In FIG. 5, the elements which are identical to those in FIGS. 1 and 2 have the same reference numerals, and the description is not needed.

FIG. 5 is a schematic view of the third embodiment of the invention.

In FIG. 5, numeral 301 is a switcher for selecting the output of the multiplier 113 or "0", and outputting the result to the adder 110.

Where any information is not to be added to image data, the switcher 301 selects terminal b so that "0" is inputted to the adder 110. Thus, the output of the scan converter 109 is applied to the scan inverter 115 through adder 110 without addition. On the other hand, where additional information should be added, the switcher 301 selects terminal a so that the output of the multiplier 113 is inputted into the adder 110. The additional data is thus added to the image data.

With the above structure, the additional information can be added without deterioration of the image quality.

[Fourth Embodiment]

Figure 6:
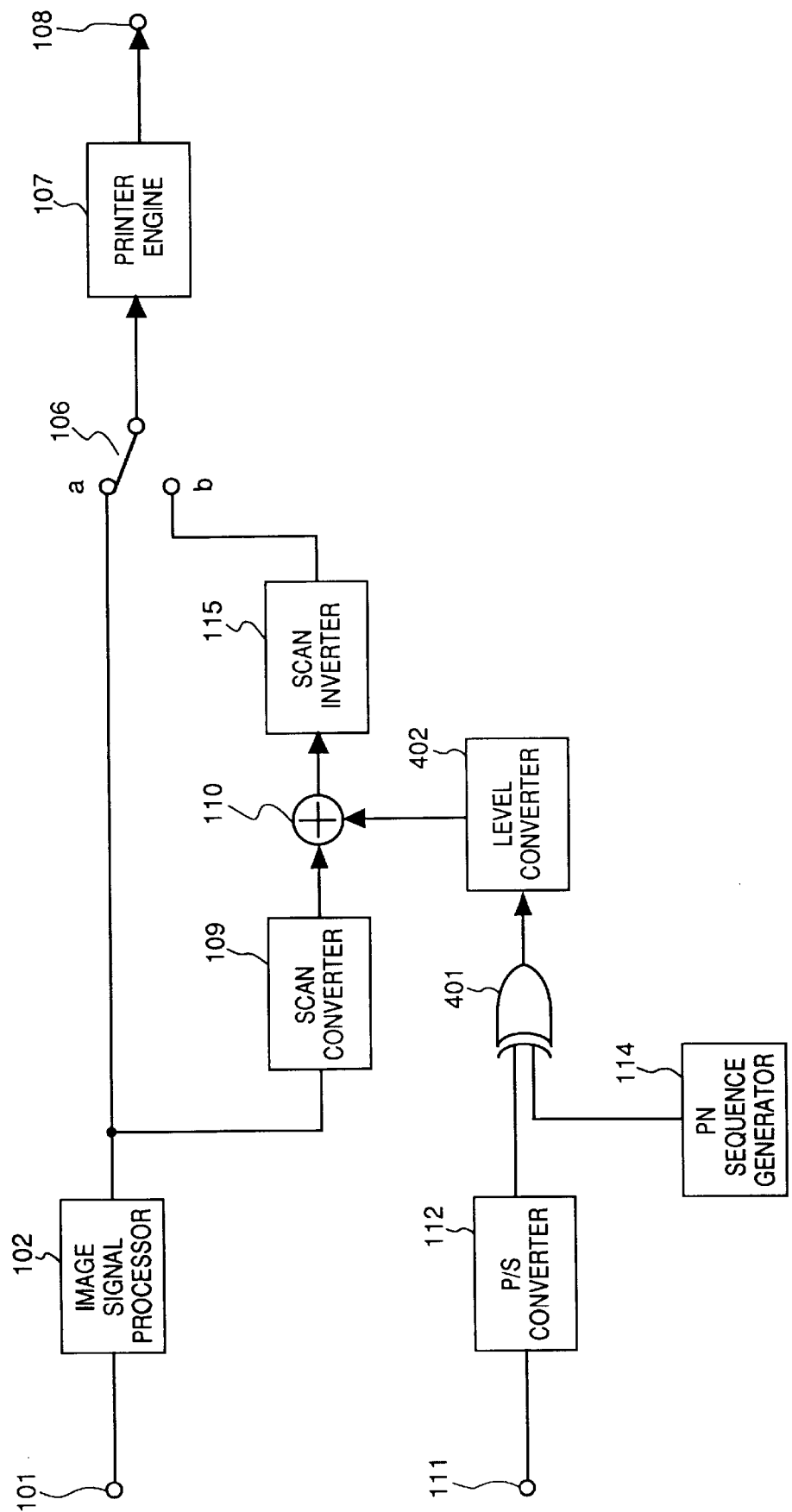
FIG. 6 is a diagram for explaining the apparatus of a fourth embodiment according to the invention.

A fourth embodiment according to the invention is described with reference to FIG. 6. In FIG. 6, the elements which are identical to those in FIG. 1 have the same reference numerals, and the description is not needed.

FIG. 6 is a schematic view of the apparatus of the fourth embodiment according to the invention.

In FIG. 6, numeral 401 is an exclusive-OR (EX-OR) gate. The EX-OR 401 is supplied with a binary signal from the P/S converter 112 and a binary signal from the PN sequence generator 104. When the two inputs are "0-0" or "1-1", the gate 401 generates "0". When the two inputs are "0-1" or "1-0", "1" is generated. The output of the EX-OR gate 401 is inputted into a level converter 402 where "0", "1" are converted to "−1", "1" levels, respectively. The output of the level converter 402 is applied to the adder 110. Subsequently, operations which are similar to those of the first embodiment are performed in the fourth embodiment system.

According to the fourth embodiment as described above which is of simple structure, the additional information can be added without deterioration of the image quality.

Eventually, each of the embodiments described above can add the additional information without deterioration of image quality. The additional information can be added not only on a multicolor image, but also on a monochromatic image without deterioration of image quality.

Furthermore, a positive effect is attained such that additional data which should be confidential is hardly noticed by a third party.

Furthermore, a stable data addition and decoding operation can be performed with less dependency on the input image pattern.

Still further, in the first embodiment through the fourth embodiment, the additional data has a value from "−1" to "1". See FIGS. 2A to 2C. However, the present invention can be applied to modifications where the additional data is ±2, ±3, or so on. Increase of the additional data value enlarges the powers of the frequency spectrum.

[Fifth Embodiment]

Figure 7:
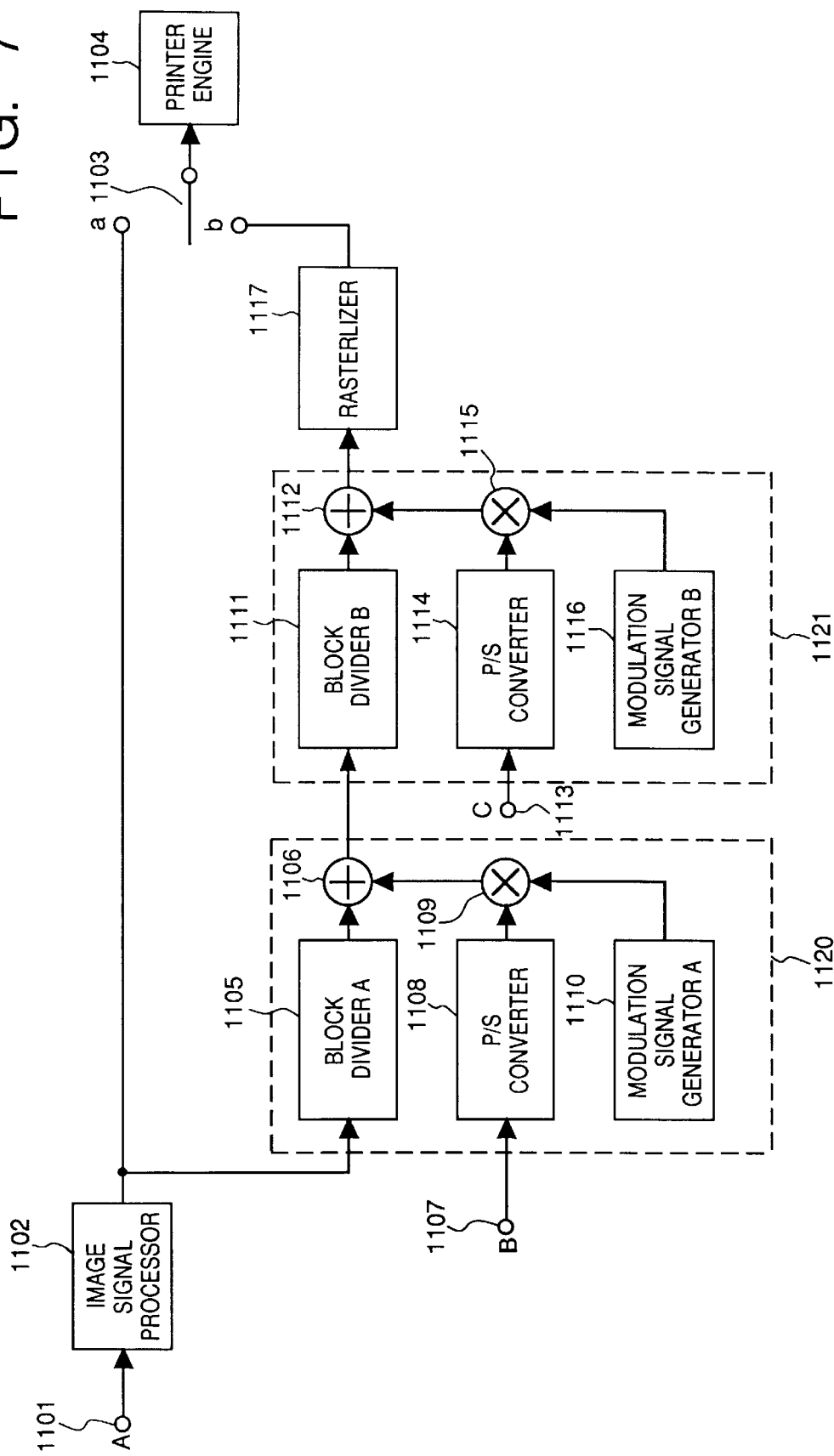
FIG. 7 is a block diagram of the construction of the apparatus of a fifth embodiment according to the invention.

FIG. 7 is a block diagram illustrating the structure of the apparatus of the fifth embodiment.

In FIG. 7, numeral 1101 denotes an input terminal A of an original image data, numeral 1102 is an image signal processor for subjecting the image data inputted from the input terminal 1101 to predetermined image processing, numeral 1103 is a switcher for switching a signal to the printer engine 104, and numeral 1104 is a printer engine for forming and outputting the image data.

Numeral 1105 is a block divider "A" for dividing the image data of the image signal processor 1102 into blocks and converting the sequence of the image data, and numeral 1106 is an adder for adding the data from the divider A to data from the multiplier 1109. The adding data to be added to the original image data is inputted at input terminal 1107 "B". Numeral 1108 is a P/S converter for converting the additional data (which is parallel format) from the input terminal B to serial data. Numeral 1109 is the multiplier for multiplying the data from the P/S converter 1108 by the data from a modulation signal generator A denoted by 1110. The modulation signal generator 1110 generates a signal for converting a spatial spectrum of the additional data on the original image.

The divider 1105, adder 1106, P/S converter 1108, multiplier 1109 and modulation signal generator 1110 comprises a first adding (or, multiplexing) processor 1120.

Numeral 1111 is a divider B for converting a sequence of the image data from the adder 1106, numeral 1112 is an adder for adding the data from the divider B 1111 to the data from the multiplier 1115, and numeral 1113 is an input terminal C of the data to be added to the input image data. Numeral 1114 is a P/S converter for converting the additional data (parallel data) from the input terminal C 1113 to serial data. Numeral 1115 is a multiplier for multiplying the data from the P/S converter 1114 by the data from a modulation signal generator B 1116. The modulation signal generator B 1116 generates a signal for converting the spatial spectrum of the additional data on the original image.

The divider B 1111, adder 1112, P/S converter 1114, multiplier 1115, and modulation generator B 1116 comprises a second adding (multiplexing) processor 1121. Furthermore, numeral 1117 is a rasterlizer for converting an output of the adder 1112 into a raster scan sequence, which is the data sequence of the original image.

The operation of the fifth embodiment is described below.

Image data is inputted into the image signal processor 1102 via the input terminal A 1101. In the image signal processor 1102, the input image data is subjected to various pre-processing such as a color conversion, masking and under color removal in accordance with the characteristics of the printer engine 1104, and the output is supplied into the terminal A of the switcher 1103. The output of the image signal processor 1102 is also inputted into the divider A 1105.

The switcher 1103 controls whether or not additional data is added to an image. When the switcher 1103 is connected to the terminal a, since the output data of the image signal processor 1102 is directly outputted to the printer engine 1104, no additional data is added to the image.

The printer engine 1104 forms an image of the input image data and outputs the formed image.

A case where the additional data is added on the image data is described below.

First, the processing of the first multiplexing processor 1120 is described.

Referring to FIG. 7, the output of the image signal processor 1102 is also inputted into the divider A 1105. The divider A 1105 converts the sequence of the image data outputted from the image signal processor 1102, and outputs the image data in the converted sequence to an input terminal of the adder 1106.

The additional data is inputted into the first multiplexing processor 1120 from the input terminal B 1107 as parallel data. The inputted parallel data is converted into a serial data sequence by the P/S converter 108, and inputted into a terminal of the multiplier 1109.

The other input terminal of the multiplier 1109 is supplied with the output signal of the modulation signal generator A 1110. The multiplier 1109 multiplies the signals, and outputs the result to the adder 1106. The operation of the multiplier 1109 provides a spatial spectrum conversion of the additional data on the original image.

Subsequently, the adder 1106 adds the image data from the divider A 1105 to the additional data from the multiplier 1109. Thus, the operation of the first adding processing is terminated, and the image data is applied to a second multiplexing processor.

The processing of the second multiplexing processor 1121 is described below.

The output of the adder 1106 is inputted into the divider B 1111 which further converts the image data sequence to a different sequence, and inputs it to an terminal of the adder 1112.

Additional data which is different from the additional data used in the first multiplexing processor is inputted into the second multiplexing processor 1121 via the input terminal C as parallel data. The inputted parallel data is converted to a serial data sequence by the P/S converter 1114, and the converted data sequence is inputted into one side of the input terminal of the multiplier 1115. The other side of the input terminal is supplied with the output signal from the modulation signal generator B 1116. The multiplier 1115 multiplies these two signals, and outputs the result to the adder 1112. The operation of the multiplier 1115 provides a spatial spectrum conversion of the additional data on the original image.

The adder 1112 adds the image data from the divider B 1111 to the additional data from the multiplier 1115. Thus, the second adding processing is ended, and the image data is outputted to the rasterlizer 1117.

The rasterlizer 1117 restores (re-converts) the image data sequence converted by the divider A 1105 and the divider B 1111, to the original raster scan sequence.

The output of the rasterlizer 1117 is connected to the terminal b of the switcher 1103. Where the additional data is added, the terminal b of the switcher 1103 is selected. As a consequence, the data from the rasterlizer 1117 is inputted into the printer engine 1104 to print out.

As described above, in this embodiment, since the first multiplexing processor 1120 and the second multiplexing processor 1121 are connected in serial, if the two multiplexing processors are identical, data interferes each other and thus decoding will be impossible. The additional data should be decoded or restored later in the first and second multiplexing processors 1120 and 1121, separately. Accordingly, in this embodiment, the divider A 1105 and the divider B 1111 are arranged so that they do not perform blocking or division in the same manner. Thus, it will be enabled to decode the additional data.

An example of the operation of the divider A 1105 and the divider B 1111 is described with reference to FIG. 8.

Figure 8:
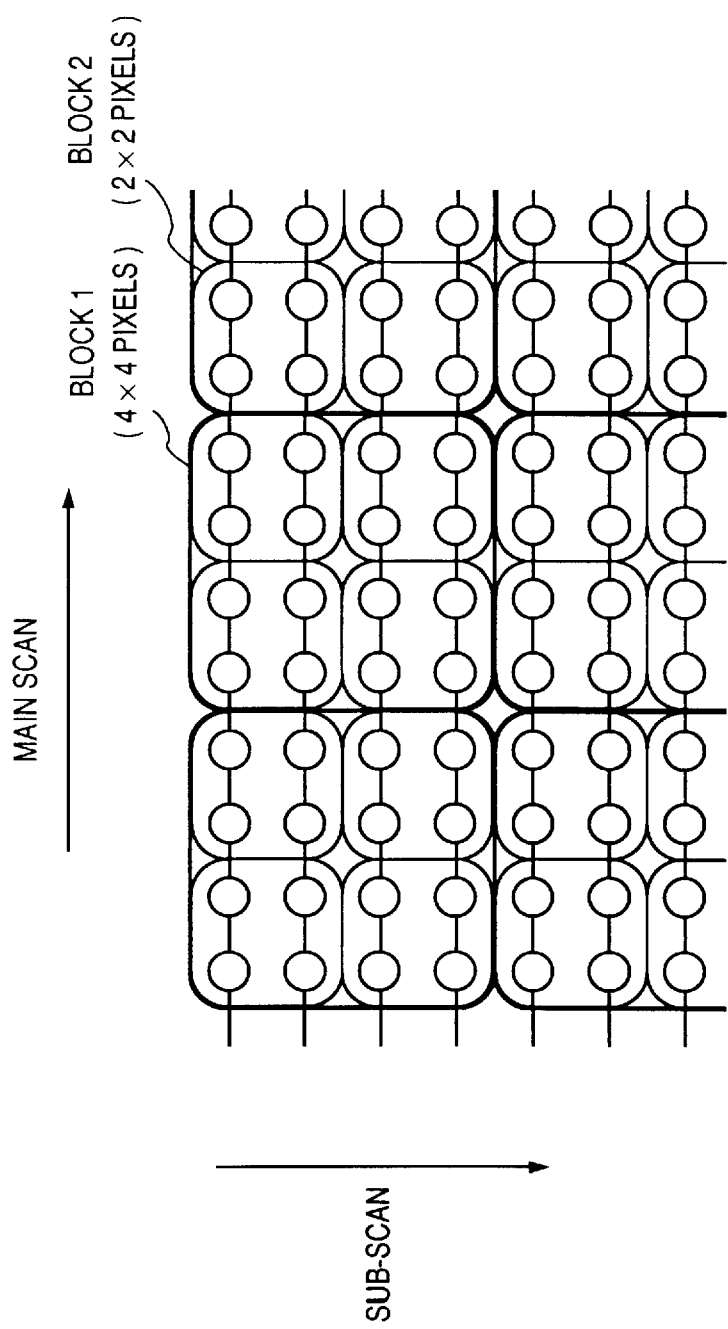
FIG. 8 is a diagram illustrating an example of the division of pixels in the fifth embodiment.

In FIG. 8, circle ○ represents a pixel of the original image, and lateral direction corresponds to the main scanning direction, while vertical direction corresponds to the sub-scanning direction.

The divider A 1105 converts a data sequence into the unit of 4×4 pixels (4 pixels in the main scanning direction and 4 pixels in the sub-scanning direction). The units are indicated in a bold line in FIG. 8. Since the adding or multiplexing process is performed in a unit of 4×4 pixels in the first multiplexing processor 1120, the additional data will be able to be decoded or restored by that manner and the decoding will be performed in a synchronized manner in a unit of 4×4 pixels.

Furthermore, a data sequence is converted in the unit of 2×2 pixels (2 pixels in the main scanning direction and 2 pixels in the sub-scanning direction) in the divider B 1111. The units are indicated by a fine line in FIG. 8. Since the adding process or the multiplexing process is performed in a unit of 2×2 pixels in the second multiplexing processor 1121, the additional data can be decoded or restored by that manner and the decoding will be performed in a synchronized manner in a unit of 2×2 pixels.

As set forth, the fifth embodiment is implemented with the independent and different synchronizations. Therefore, the different additional data can be independently decoded or restored. In this regard, note should be made that the modulation signal generators A 1110 and B 1116 should respectively correspond to each processing cycle.

Another example of the operation of the divider A 1105 and divider B 1111 is described with reference to FIG. 9.

Figure 9:
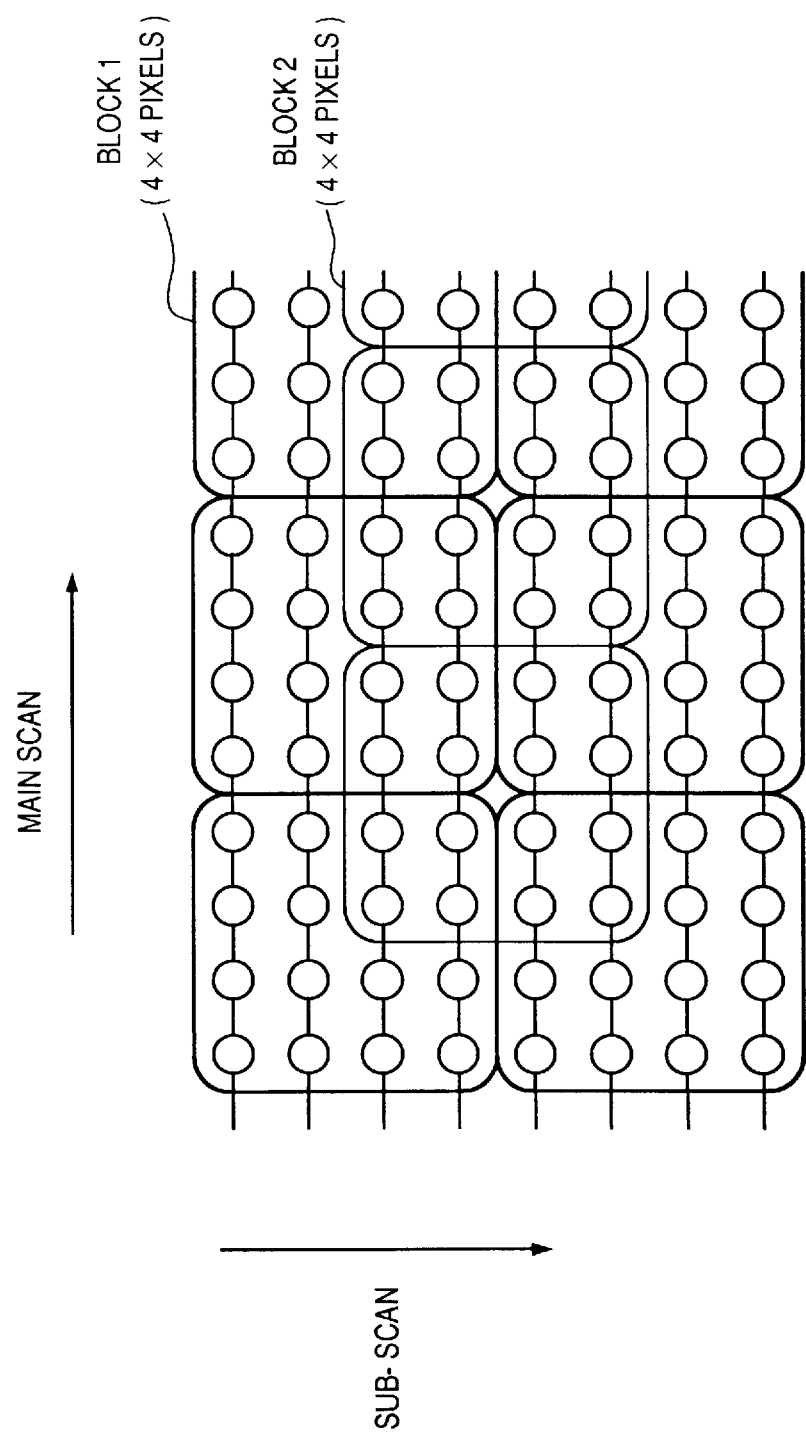
FIG. 9 is a diagram illustrating another example of the division of pixels in the fifth embodiment.

A circle in FIG. 9 represents a pixel of the original image as in FIG. 8. The lateral direction corresponds to the main scanning direction, while the horizontal direction corresponds to the sub-scanning direction.

The block unit of the divider A 1105 and divider B 1111 is 4×4, which is the same as in FIG. 9. However, the dividers are arranged so that blocked positions of the blocking by both the dividers in the image space differ from each other. More specifically, as shown in FIG. 9, blocking by the divider 1105 is made in the manner as illustrated by rectangles in a bold line, and blocking by the divider 1111 is made in the manner as illustrated by rectangles in a fine line. This arrangement generates different synchronizing points, and thus the additional data will be allowed to be independently decoded or restored by separate synchronization.

As described above, a plurality of different additional data can be added or multiplexed by applying different dividing schemes to the original image.

Figure 10:
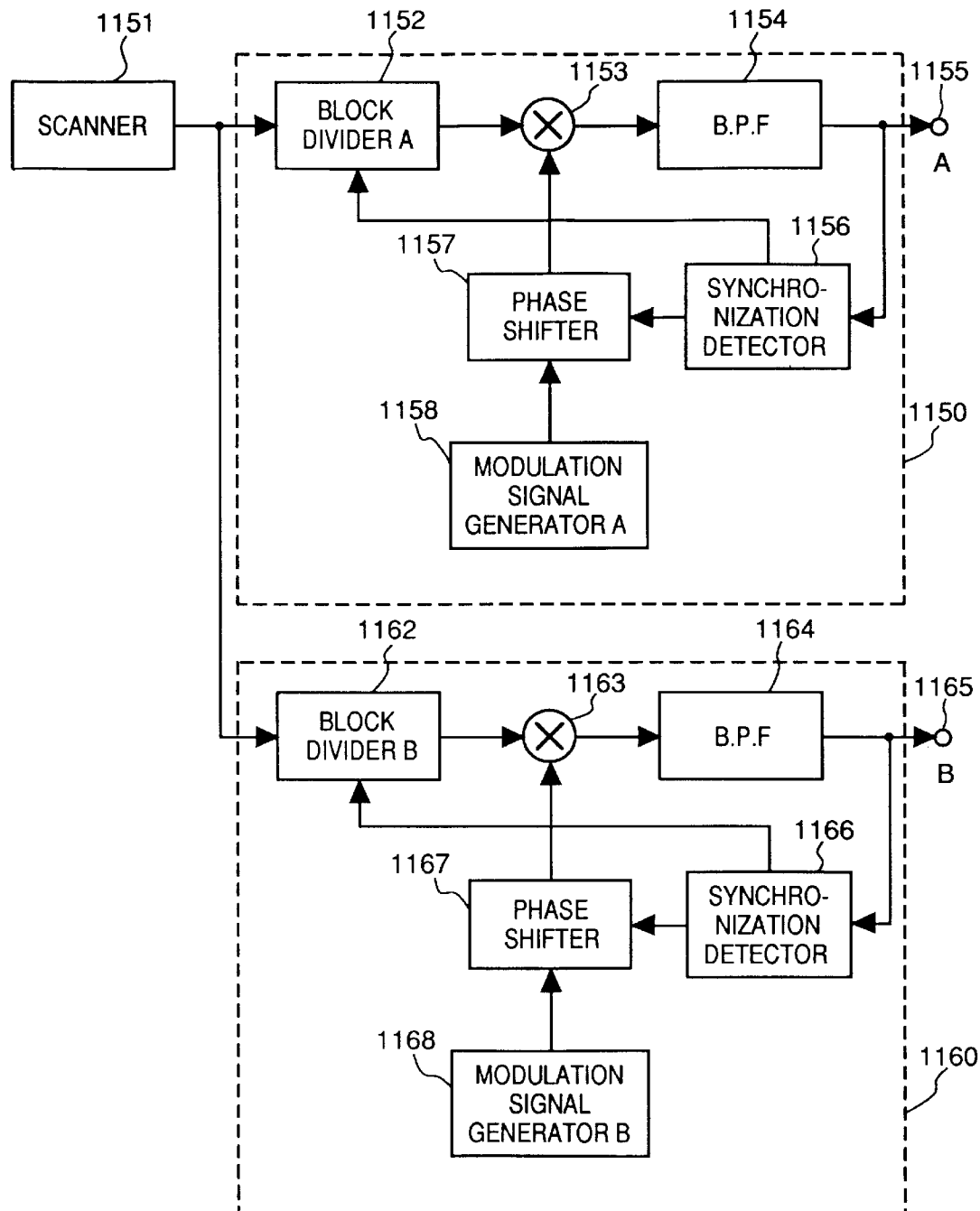
FIG. 10 is a block diagram illustrating the construction of the decoding processor in the fifth embodiment.

Referring to FIG. 10, described below is how to reproduce or restore the original additional data from the output image on which a plurality of additional data have been added or multiplexed.

In FIG. 10, numeral 1151 is a scanner for reading an image, numerals 1152 and 1162 are respectively a divider A and a divider B for converting a data sequence, numeral 1163 is a multiplier, numerals 1154 and 1164 are band pass filters (BPF). Numerals 1555 and 1165 denote terminals for decoded additional data. Numerals 1156 and 1166 are synchronization detectors, numerals 1157 and 1167 are phase shifters, numeral 1158 is a modulation signal generator A, and numeral 1168 is a modulation signal generator B 1168.

The divider A 1152, multiplier 1153, BPF 1154, synchronization detector 1156, phase shifter 1157, and modulation signal generator A 1158 comprises a first decoding processor 1150. Similarly, the divider B 1162, multiplier 1163, BPF 1164, synchronization detector 1166, phase shifter 1167, and modulation signal generator B 1168 comprises a second decoding processor 1160.

The scanner 1151 reads an image original which is outputted from the printer engine 1104 shown in FIG. 7. The read image includes multiplexed additional data, and then is outputted to the first decoding processor 1150 and second decoding processor 1160.

The first decoding processor decodes or restores the additional data added or multiplexed by the first multiplexing processor 1120 (shown in FIG. 7), while the second decoding processor decodes or restores the additional data added by the second multiplexing processor 1121 (shown in FIG. 7).

First, the first decoding processor 1150 is described below.

The image signal inputted from the scanner 1151 is inputted into the divider A 1152, and the order of the image data sequence is altered so as to have the identical space to that of the divider A 1105 of the first multiplexing processor 1120, and the data in the converted order is applied into the multiplier 1153.

The multiplier 1153 is supplied with a signal from the phase shifter 1157, and reconverts the data including the multiplexed data to have the spectrum of the original image by multiplying by the signal from the divider A 1152.

The output of the multiplier 1153 is transmitted to the BPF 1154, and the original additional data will present at the output terminal A 1155 through removing unnecessary spectrum therefrom and extracting the desired signal.

The signal from the phase shifter 1157 which is inputted to the multiplier 1153 needs to have a signal timing which is the same as that when additional information was added. Accordingly, the modulation signal generator A 1158 generates a timing signal which is the same as that of the modulation signal generator A 1110 of the first adding processing 1120. The phase shifter 1157 is provided so as to produce a processing timing which is similar to that of the multiplexing process.

The phase shifter 1157, which may be composed of a FIFO circuit, performs a variable delay operation, and is controlled by the output of the synchronization detector 1156.

The synchronization detector 1156 determines whether synchronized or non-synchronized state exists based on the output result of the BPF 1154. The synchronization detector 1156 assures a synchronized state by controlling the timing of blocking operations in the divider A 1152 as well as the timing of the modulation signal from the generator 1158. Synchronizing points, which are points where the BPF 1154 produces a maximum output, are obtained or searched by shifting the phase of the signal of the modulation signal generator A 1158 using the shifter 1157 and by shifting the phase of blocking performed in the divider A 1152.

If the multiplexing process is performed in the first multiplexing processor 1120 (shown in FIG. 7) under the condition that the block division operation by the divider A 1105 is being synchronized with the modulation signal from the modulation signal generator A 1110, the phase shifter 1157 becomes unnecessary.

With the above control, the additional information which was added in the first multiplexing processor 1120 of FIG. 7 can be extracted by the first decoding processor 1150.

The operation of the second decoding processor 1160 is now described below.

The image signal inputted from the scanner 1151 is also supplied into the divider B 1162, and the sequence order of the image data is converted so as to be the same space as that of the divider B 1111 of the second multiplexing processor 1121 (shown in FIG. 7). The data in the converted order is inputted into the multiplier 1163.

The multiplier 1163 is supplied with the signal from the phase shifter 1167, and reconverts the data including the additional data into the spectrum of the original image by multiplying by the signal from the divider B 1162.

The output of the multiplier 1163 is transmitted to the BPF 1164, and the original additional data can be obtained from the output terminal B 1165 by removing unnecessary spectrum and extracting the desired signal.

The signal from the phase shifter 1167 which is inputted to the multiplier 1163 needs to have a timing which is the same as that when additional information was multiplexed. Therefore, the modulation signal generator B 1168 is provided so as to generate a timing signal which is the same as that of the modulation signal generator B 1116 of the second adding processing 1121, and the phase shifter 1167 is provided so as to generate a processing timing which is similar to that of the multiplexing process.

The phase shifter 1167 may be composed of a FIFO circuit for performing a variable delay operation, and is controlled by the output of the synchronization detector 1166.

The synchronization detector 1166 determines whether synchronized or non-synchronized state exists based on the output result of the BPF 1164. The synchronization detector 1157 assures a synchronized state by controlling the timing of blocking operations in the divider A 1162 as well as the timing of the modulation signal from the generator 1168. Synchronizing points, which are points where the BPF 1164 produces a maximum output, are obtained or searched for by shifting the phase of the signal of the modulation signal generator A 1168 using the shifter 1167 and by shifting the phase of blocking performed in the divider A 1162.

If the multiplexing process is performed in the second multiplexing processor 1121 (shown in FIG. 7) under the condition that the block division operation by the divider B 1111 is being synchronized with the modulation signal from the modulation signal generator B 1116, the phase shifter 1167 becomes unnecessary.

With the above control, the additional information which was added in the second multiplexing processor 1121 of FIG. 7 can be extracted by the second decoding processor 1160.

As described above, according to the fifth embodiment, more additional information can be added or multiplexed to image data without deterioration of the image.

[Sixth Embodiment]

The sixth embodiment according to the present invention is described with reference to FIG. 11.

Figure 11:
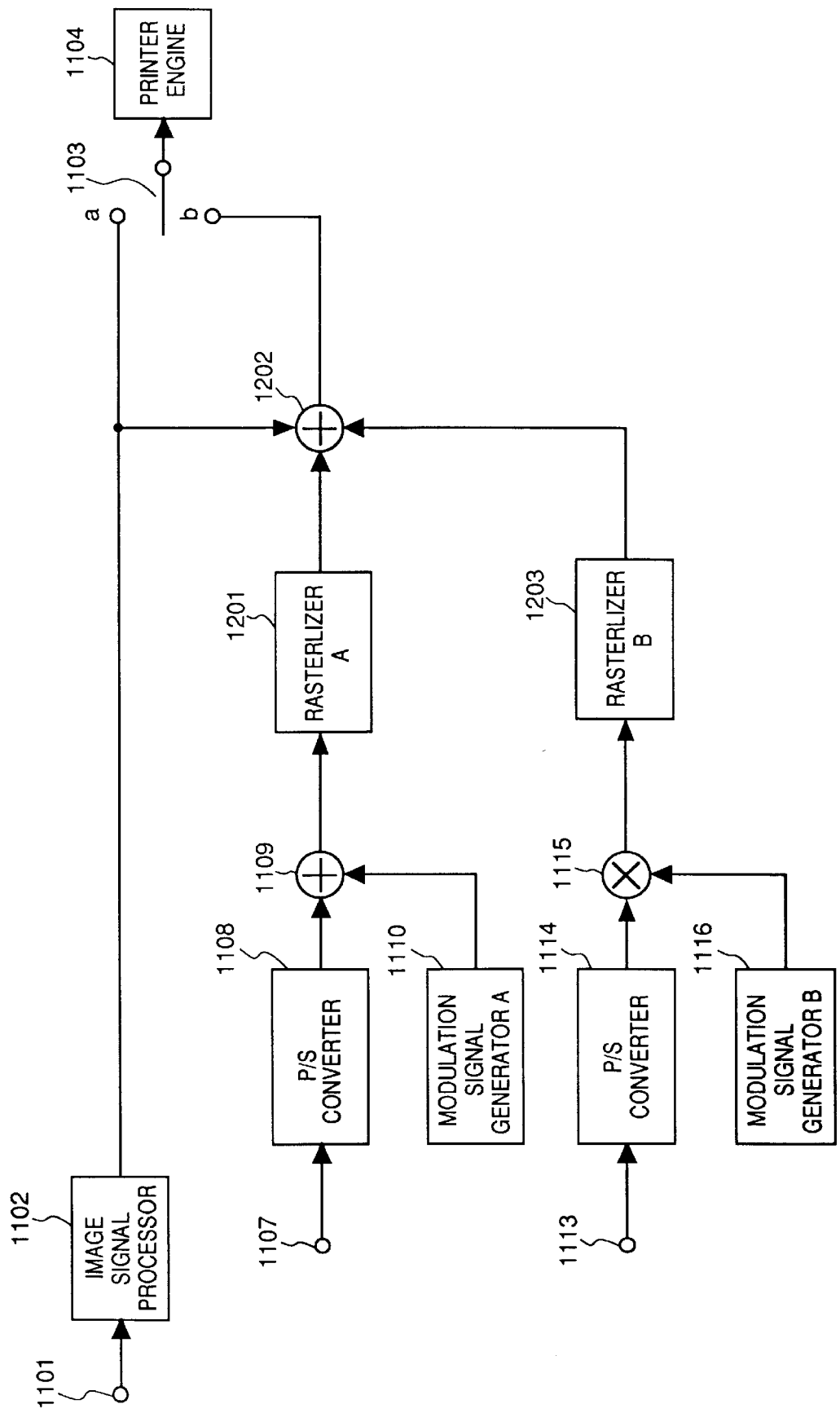
FIG. 11 is a block diagram of the construction of the apparatus of a sixth embodiment according to the invention.

In FIG. 11, the elements which are identical to those in FIG. 7 have the same reference numerals, and the description thereof is omitted.

FIG. 11 is a block diagram illustrating the structure of the sixth embodiment according to the invention.

In FIG. 11, numerals 1201 and 1203 are respectively rasterlizer A and rasterlizer B. The rasterlizer converts the data sequence of a signal to which additional data from the multipliers 1109 and 1115 were multiplexed into a raster scan sequence which is the sequence of the image data. Numeral 1202 is an adder for adding the outputs of the rasterlizer A 1201 and rasterlizer B 1203 to the signal from the image signal processor 1102, respectively.

The adding operation by the adder 1202 realizes multiplexing of the additional data.

The output of the adder 1202 is connected to the terminal b of the switcher 1103. Processes which are similar to the first embodiment are performed, and the image data is printed out.

While the fifth embodiment adds the additional data to the image data on the divided data sequence, the sixth embodiment adds the additional data which is in the usual raster scan sequence.

Consequently, the sixth embodiment provides the same effects as the fifth embodiment.

[Seventh Embodiment]

The seventh embodiment according to the invention is described with reference to FIG. 12.

Figure 12:
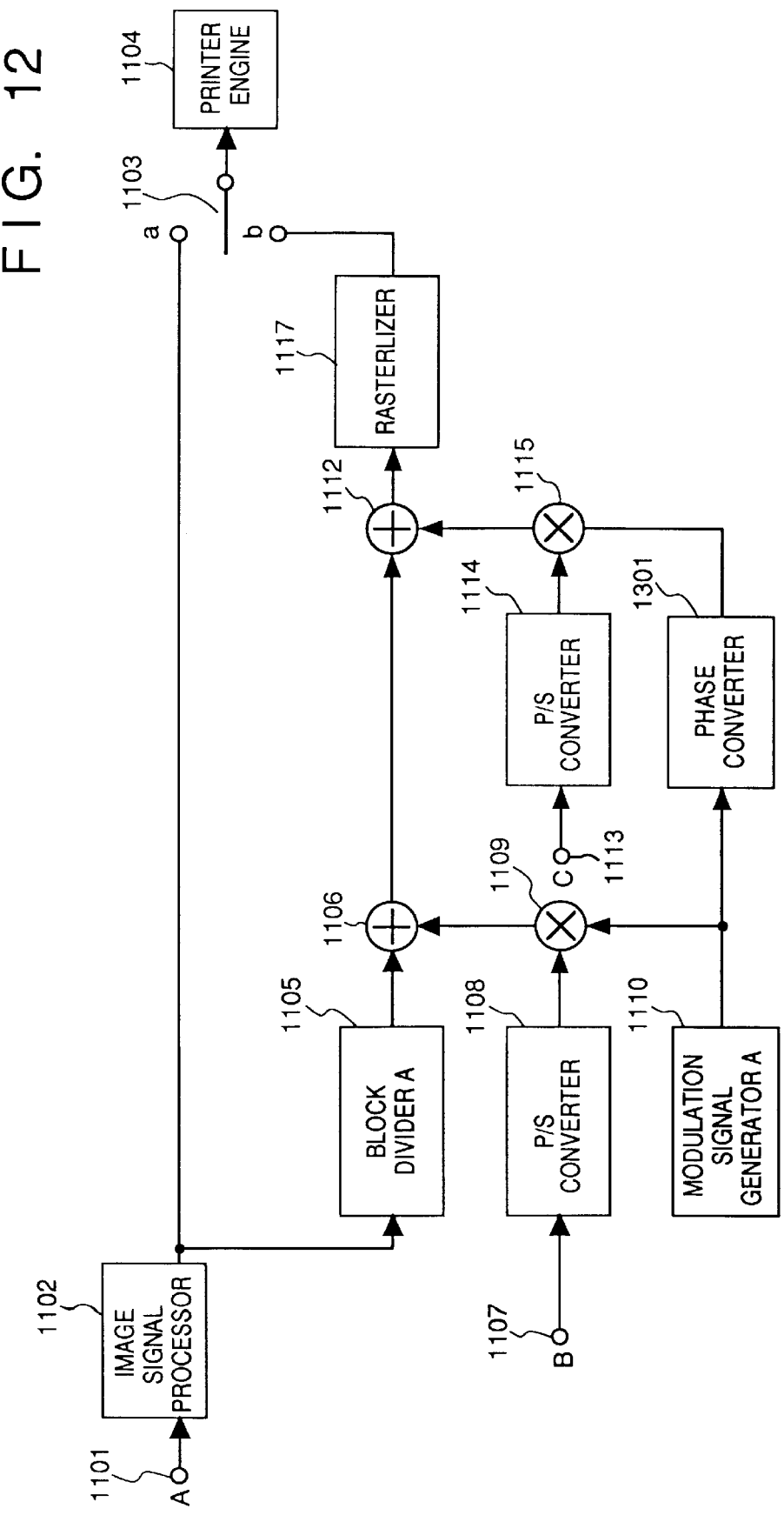
FIG. 12 is a block diagram of the construction of the apparatus of a seventh embodiment according to the invention.

In FIG. 12, the portions which are identical to those of the fifth embodiment shown in FIG. 7 have the same reference numerals, and the description thereof is omitted.

FIG. 12 is a block diagram illustrating the construction of the apparatus of the seventh embodiment according to the invention.

In FIG. 12, the seventh embodiment is further provided with a phase shifter (denoted by numeral 1301) for the shifting of the phase of the signal inputted from the modulation signal generator A 1110, and outputting to the multiplier 1115.

In the seventh embodiment, the divider B 1111 and modulation signal generator B 1116 of the second multiplexing processor 1121 are omitted. Instead of the modulation signal generator B 1116, the phase shifter 1301 shifts phase of the signal from the modulation signal generator A 1110, and the shifted signal is supplied to the adder 1115.

With the above structure, even though pixels which are subjected to multiplexing are within the same block, since the phases of the modulation signals are different, the decoding of the added information can be independently performed.

As described above, in the seventh embodiment, the effects which are similar to those in the fifth embodiment can be obtained.

In the above described fifth, sixth and seventh embodiments, the additional image data is added in the two multiplexing processors. However this does not impose a limitation upon the invention. For example, if three, four or more multiplexing processors are provided, more information can be added on the image.

As described above, according to the fifth through seventh embodiments, the amount of the data to be added is not restricted by the block size and the image area, and more information can be added in a predetermined image area.

At the same time, since the block size is not reduced to correspond to the data amount, the added information can be constantly decoded by suppressing the image deterioration.

Now will be described the strucures and operations of eighth to sixteenth embodiments according to the present invention.

[Common Structure (FIG. 13)]

Figure 13:
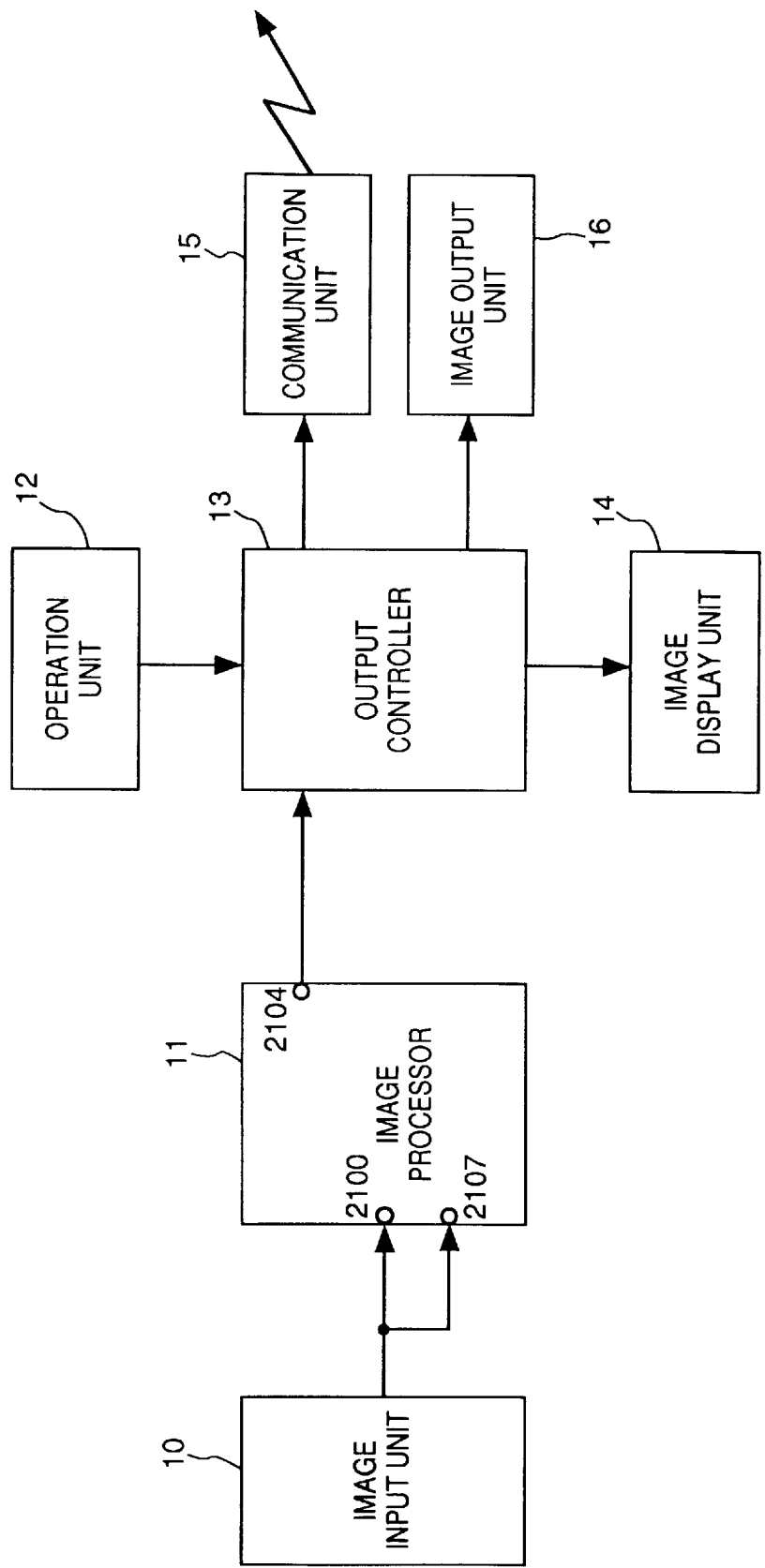
FIG. 13 is a block diagram illustrating the overall construction of the image processing apparatus as a typical embodiment of the invention.

FIG. 13 is a block diagram illustrating the overall construction of the image processing apparatus of the eighth to sixteenth embodiments. This overall structure may also be used in the previous embodiments.

In FIG. 13, numeral 10 is an image input unit comprising an image reading apparatus such as an image scanner including CCD sensors and an interface with external devices such as host computer, SV camera and video camera. The image data inputted from the image input unit 10 is supplied to input terminals 2100, 2107 of an image processor 11. Numeral 12 is an operation unit through which an operator designates a destination of the image data. Numeral 13 is an output controller for outputting synchronizing signals for image data reading. The synchronizing signals are such as an ITOP signal from the output controller which comprises a printer engine with the image output unit 16, and connection information obtained through manual keys of the operation unit 12 or connection information varying the printer resolution. Numeral 104 is an output terminal of the image processor 11. Numeral 14 is an image display unit, numeral 15 is a communication unit for transmitting/receiving image data via a public line or LAN, and numeral 16 is the image output unit such as a laser beam printer for irradiating the laser beam onto a photo receptor to form a latent image, and visualizing this image.

The image output unit 16 may be an ink-jet printer, a bubble-jet printer, a thermal-transfer printer or a dot printer.

The input terminal 2100 is supplied with the image data, while the input terminal 2107 is supplied with the additional data via the input terminal 2100.

[Eighth Embodiment (FIGS. 14–15)]

Figure 14:
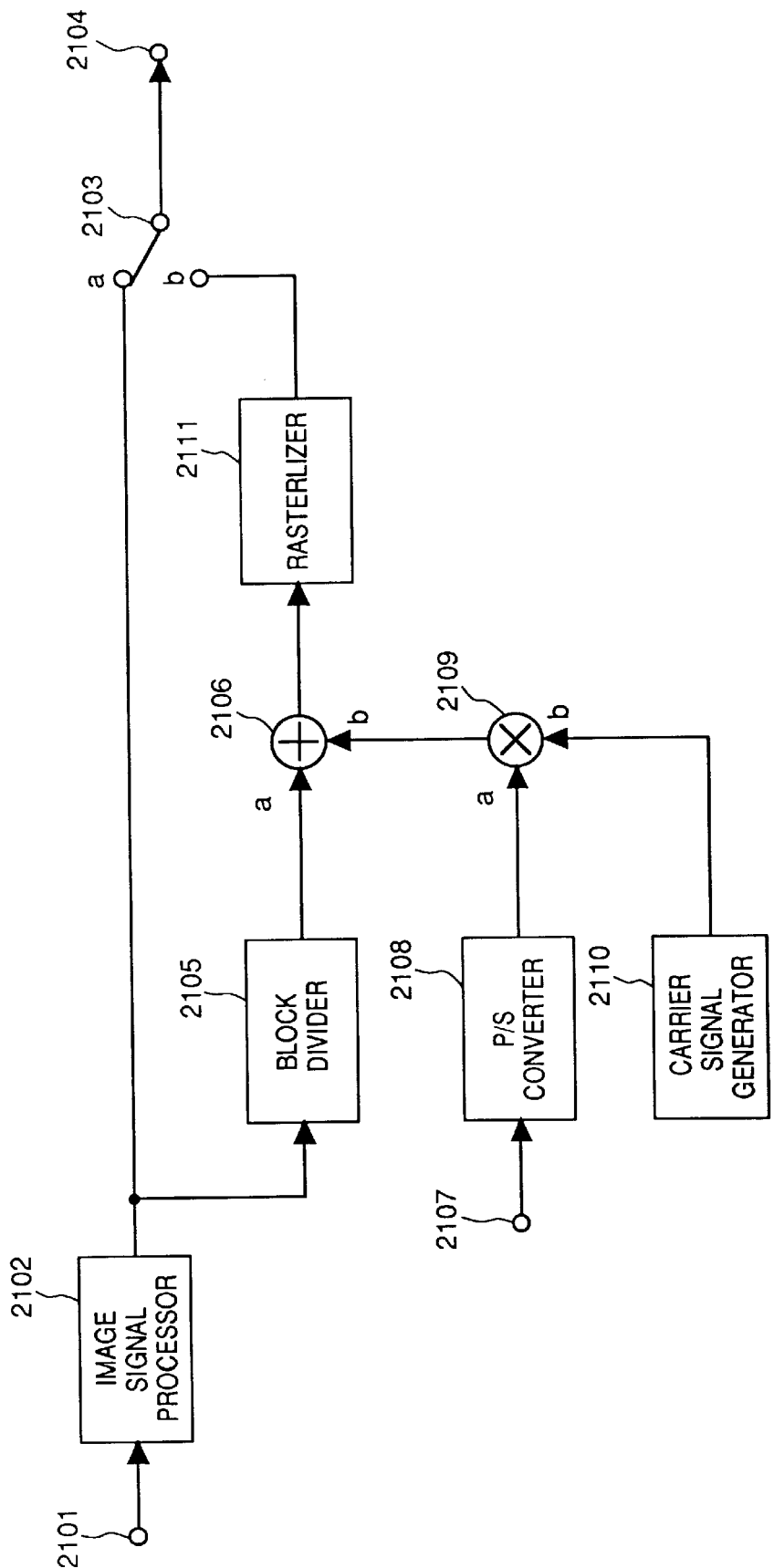
FIG. 14 is a block diagram illustrating the construction of the image processor 11 according to an eighth embodiment.

FIG. 14 is a block diagram illustrating the construction of the image processor 11 in accordance with the eighth embodiment. In FIG. 14, numeral 2102 is an image signal processor for performing a predetermined image processing on input image data from the input terminal 2101, and numeral 2103 is a switcher for switching to the output terminal 2104. Numeral 2105 is a divider for converting a sequence of the image data from the image signal processor 2102 by dividing the image data into blocks. Numeral 2106 is an adder for adding the input data from the divider 2105 to input data from the multiplier 2109, and numeral 2108 is P/S converter for converting the additional data (parallel data) from the input terminal 2107 to serial form. Numeral 2109 is a multiplier for multiplying the data from the P/S converter 2108 by the data from a carrier signal generator 2110. The carrier signal generator 2110 generates a signal to add or multiplex the additional data as a spatial spectrum to the original image data. Numeral 2111 is a rasterlizer for converting the image data sequence from the adder 2106 to a raster scan sequence which is a data sequence of the original image data.

The operation of the image processor 11 having the construction shown in FIG. 14 is described below.

(1) When no additional data is added:

Image data is inputted into the image signal processor 2102 via the input terminal 2101. In the image signal processor 2102, the input image data is subjected to various preparation processing such as a color conversion, a masking and an under color removal operation in accordance with the characteristics of the printer engine (comprised of the output controller 13 and image output unit 16), and the output of the processor 2102 is supplied to the terminal a of the switcher 2103. The output of the image signal processor 2102 is also inputted into the divider 2105. The switcher 2103 controls whether or not additional data is added to the input image. When the switcher 2103 is connected to the terminal a, the output data of the image signal processor 2102 is directly outputted to the printer engine.

The printer engine forms an image from the input image data and outputs the formed image. Accordingly, whenever the additional image is added to the image, the switcher 2103 is connected to the terminal a.

(2) When the additional data is added to the image:

As described above, the output of the image signal processor 2102 is also inputted into the divider 2105. The divider 2105 converts the sequence of the image data from the image signal processor 2102, and outputs the converted image data to the side a of the input terminal of the adder 2106.

Additional data is inputted from the input terminal 2107 as parallel data. The inputted parallel data is converted into a serial data sequence by the P/S converter 2108, and is inputted into the terminal a of the multiplier 2109. The terminal b of the multiplier 2109 is supplied with the output signal of the carrier signal generator 2110. The multiplier 2109 multiplies these signals, and outputs the result to the terminal b of the adder 2106. The multiplier 2109 produces a spatial spectrum conversion of the additional data on the original image.

Subsequently, the adder 2106 adds the image data from the divider 2105 to the additional data from the multiplier 2109, and the result is outputted to the rasterlizer 2111. By this addition, the additional image is multiplexed with the image data.

The rasterlizer 2111 converts the image data sequence converted by the divider 2105 to the original raster scan sequence. The output of the rasterlizer 2111 is connected to terminal b of the switcher 2103. Where the additional data is added, the switcher 2103 selects the terminal b. As a consequence, the data from the rasterlizer 2117 is inputted into the printer engine to be printed out.

Figure 15:
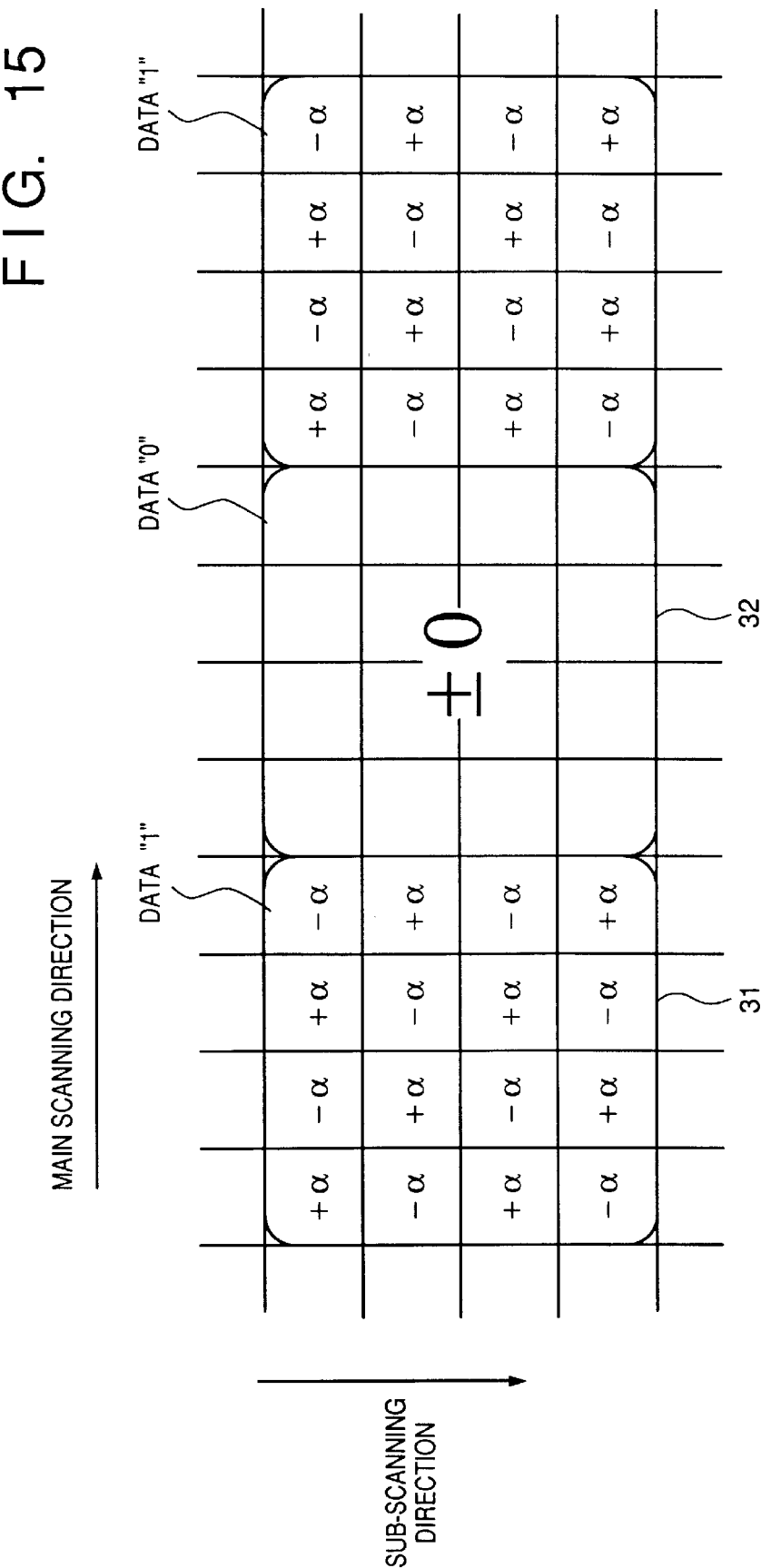
FIG. 15 is a diagram illustrating the adding processing operation of adding data in accordance with the eighth embodiment.

The multiplexing operation of the additional data with respect to the image data is described with reference to FIG. 15. In FIG. 15, each grid represents a single pixel. The lateral direction corresponds to the main scanning direction, while the vertical direction corresponds to the sub-scanning direction where an image is formed in the lateral direction by the printer engine. If the printer engine uses a laser beam whose beam width is controlled by the image data, the "main scanning direction" represents the scanning direction of the laser beam when it scans a photosensitive drum, and a "sub-scanning direction" indicates a rotating direction of the photosensitive drum.

The divider 2105 converts the input image data sequence by dividing it into blocks so that each block is composed of 16 pixels (4 pixels in the main scanning direction and 4 pixels in the sub-scanning direction). The image data is processed in the adder 2106 or the multiplier 2109 in the unit of 4×4 pixels, and additional data of 1 bit is added to each block.

First, described will be the case where the additional data is of 1 bit having value "1".

In this eighth embodiment, the carrier signal generator 2110 generates a signal (referred to as a "carrier signal") which alternatively changes as $+\alpha$, $-\alpha$ each pixel and which has a spatial spectrum on the image signal space. The multiplier 2109 multiplies the carrier signal by output data "1" from the P/S converter 2108, and then the multiplied result is inputted into the adder 2106. As a consequence, the output signal of the adder 2106 is an image signal which corresponds to block 31 of FIG. 15. In this figure, "$+\alpha$" means to add "$+\alpha$", while "$-\alpha$" means to add "$-\alpha$". Where a similar processing is performed on one bit of the additional data having value "0", the image signal corresponds to the block 32 of FIG. 15. More specifically, the original image itself is outputted from the adder 2106. Such adding processing is performed over the input image. As a result, the additional information is periodically added on the image in the main scanning direction or/and sub-scanning direction.

In this embodiment, one block is composed of 4×4 pixels. However, this does not impose a limitation upon the invention. The number of pixels within a block can be increased or decreased. If the number of pixels in a block is reduced, more data can be added. In this connection, however, reducing block size results in the reduction in the area expressing one bit (the number of pixels is reduced). Therefore, this reduction will cause a deterioration or in the data a failure of decoding the additional data if the surface of a print output is damaged or stained. On the other hand, if the number of pixels in a block is increased, the added signal is decoded stably. However, the amount of data to be added is reduced. Accordingly, a balanced pixel composition is required in consideration of the positive and negative effects.

Furthermore, increasing the value of $\pm\alpha$ causes stability at the decoding. On the other hand, decreasing the value will cause less stability and suppression of the image deterioration. The "$\pm\alpha$" serves as a modulation amount with respect to the image original. The value of $\pm\alpha$ is set to a small value taking tone levels capable of expressing the original image and the characteristics of the printer engine into consideration, so that the modulation signal will not distinctively appear on the original image.

Various values can be adapted in accordance with the characteristics of the printer engine for performing an image formation output adapted to the visual characteristics of human eyes.

Figure 16:
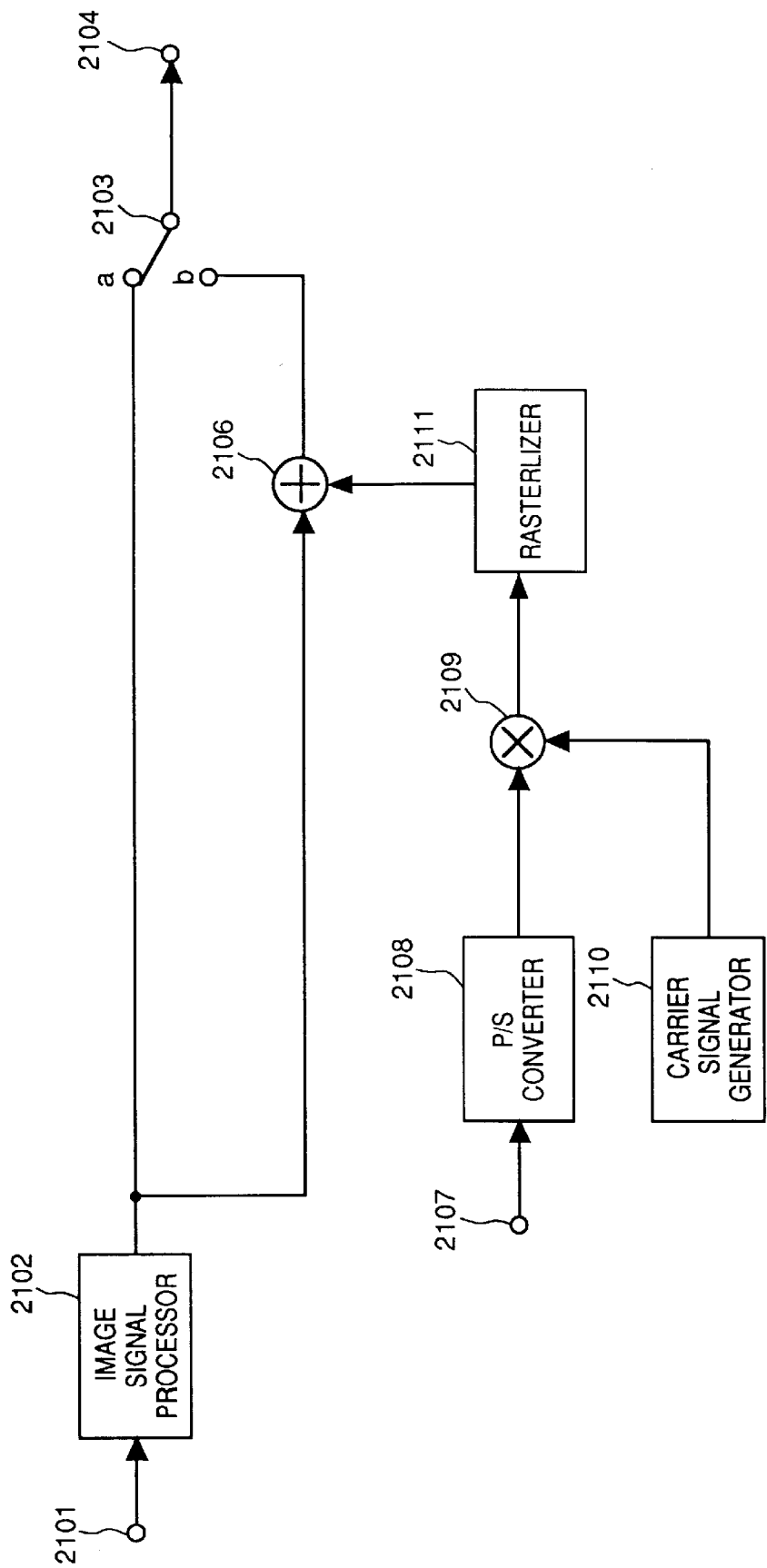
FIG. 16 is a block diagram illustrating the construction of the image processor 11 which is a modification of the eighth embodiment.

As set forth, the multiplexing operation of the additional data to the image data performed in the multiplier 2109 may be realized without inputting the output of the multiplier 2109 into the adder 2106. For example, as a modification of FIG. 16, the output of the multiplier 2109 may be inputted into the rasterlizer 2111, and may be converted into data in the form such that the raster scan can be performed on the generated data to be divided. The output is inputted into the adder 2106, and is added to the image data, and thus the additional data is directly added to the original image. In this case, the divider 2105 will be eliminated from the image processor, and the construction of the apparatus can be simplified.

According to the embodiment, since the addition of the additional data to the image data can be performed by adding a small pixel value for the additional data of 1 bit to a plurality of pixels, the additional information can be multiplexed to the image data, while deterioration of the image quality is avoided for the overall image.

[Ninth Embodiment]

Figure 17:
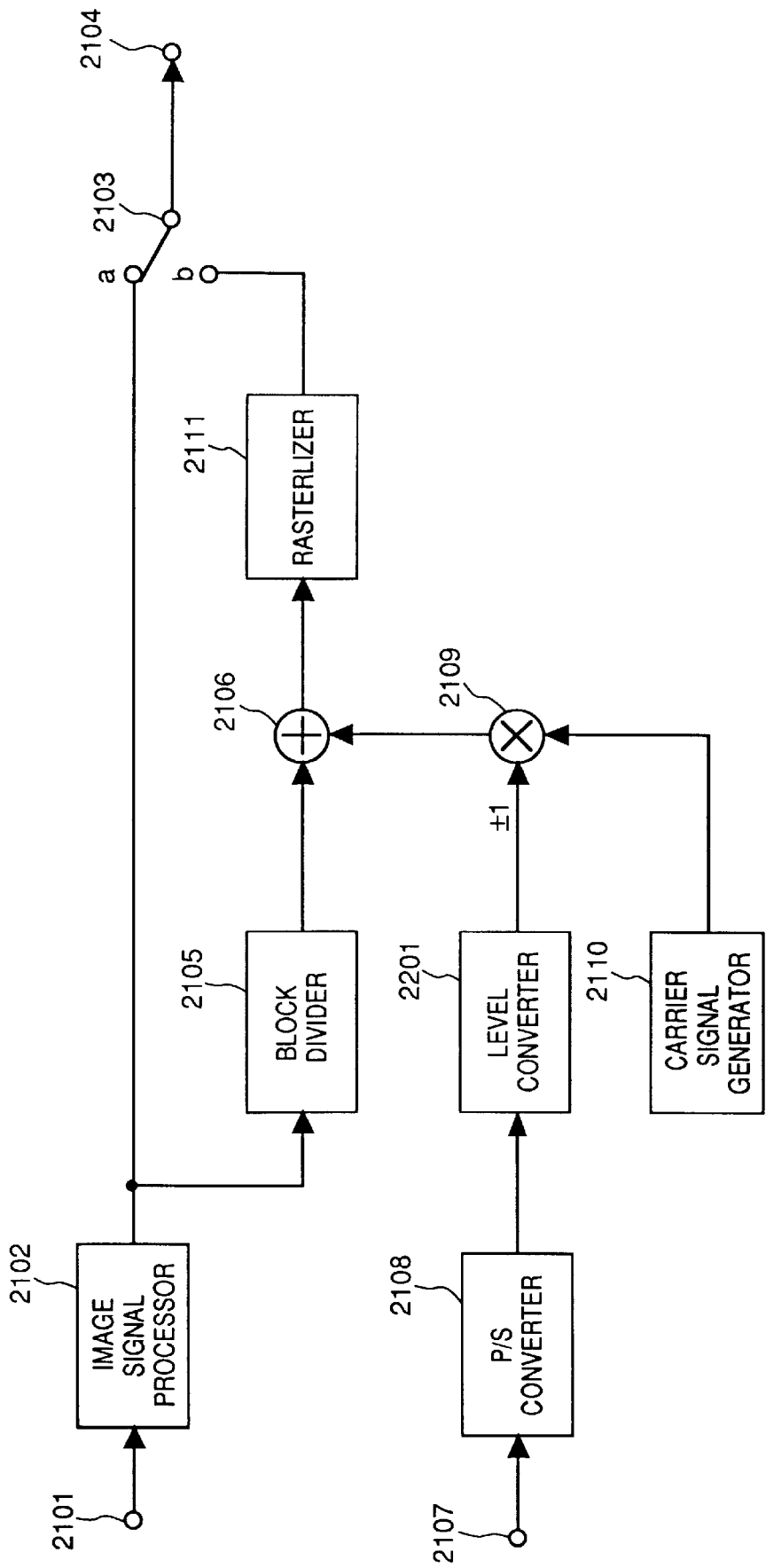
FIG. 17 is a block diagram illustrating the construction of the image processor 11 in accordance with a ninth embodiment.

FIG. 17 is a block diagram illustrating the construction of the image processor 11 in accordance with the ninth embodiment. In FIG. 17, the portions which are identical to those in the eighth embodiment have the same reference numerals, and the description thereof is omitted.

In FIG. 17, numeral 2201 is a level converter which inputs a signal from the P/S converter 2108 and outputs the signal to the multiplier 2109 after level conversion.

The operation of the embodiment will be described below.

The level converter 2201 examines the value of each bit of the additional data inputted from the P/S converter 2108. If the value is "1", the signal is outputted to the multiplier 2109. If the value is "0", the value is converted to "−1", and the converted value is outputted to the multiplier 2109. Accordingly, when the multiplier 2109 inputs the carrier signal from the carrier signal generator 2110 which is similar to the eighth embodiment, the multiplier 2109 outputs a carrier signal from the carrier signal generator 2110 without change, if the additional data value is "1". On the other hand, if the additional data value is "0", the output is an inverted signal of the carrier signal from the carrier signal generator 2110.

Figure 18:
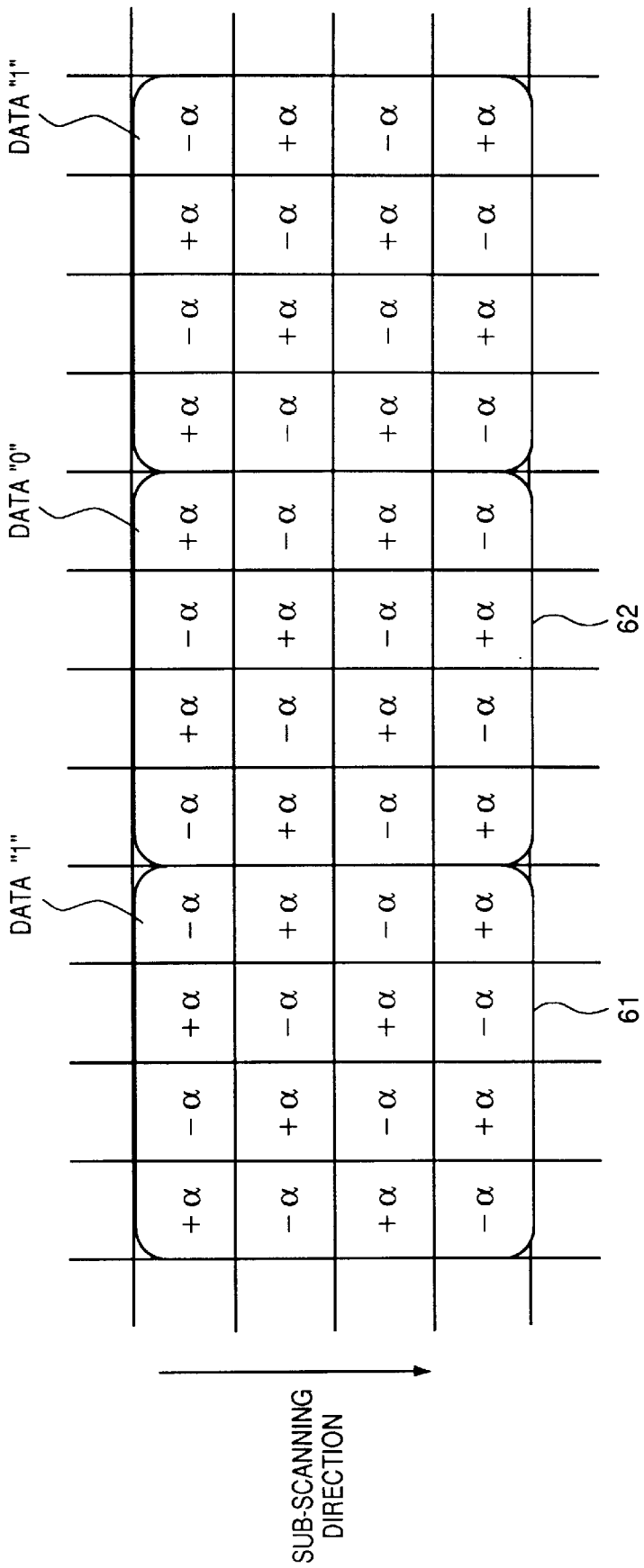
FIG. 18 is a diagram illustrating the adding processing operation of adding the additional data in accordance with the ninth embodiment.

The signal outputted from the multiplier 2109 is inputted into the adder 2106. When this signal is added to the divided image data, the output result from the adder 2106 is as shown in FIG. 18. In FIG. 18, the block 61 is an output result when the additional data value is "1", and the block 62 is an output result when the additional data value is "0". From this figure, it is recognized that the phases of the spatial carrier signal comprising "+α" and "−α" are different for both values "0" and "1" of the additional data.

Grids, the main scanning direction and the sub-scanning direction shown in FIG. 18 have respectively of the same meanings as in the eighth embodiment.

Where the additional data value is "0", the original image is directly outputted without change in the eighth embodiment. On the other hand, where the additional data value is "0", the multiplexing of additional data to the original image is performed with a different phase of the carrier signal (from the carrier signal generator 2110) from the case where the additional data is "0". Thus, the ninth embodiment can multiplex the additional information to the image data, while image deterioration is avoided.

Figure 19:
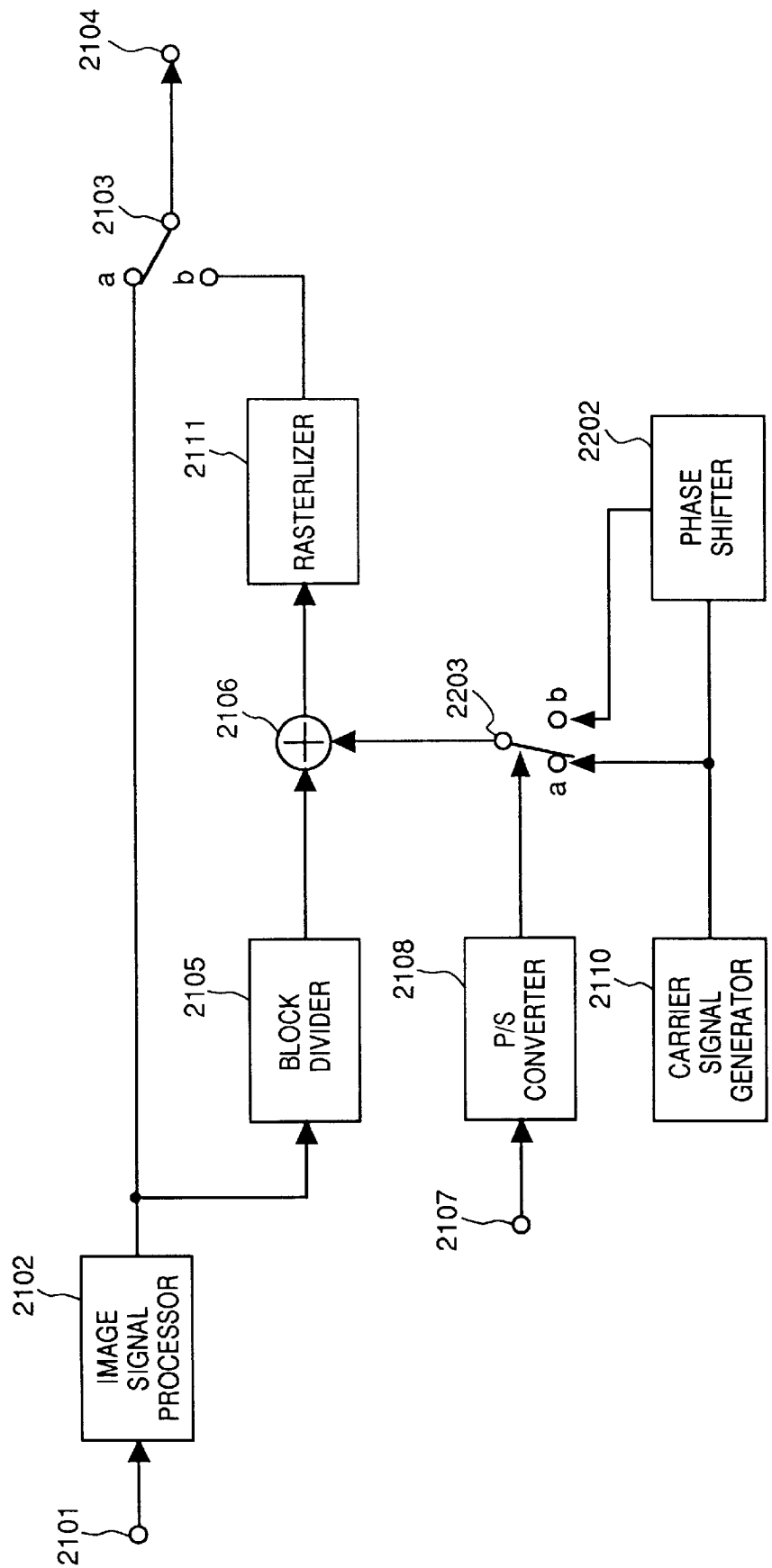
FIG. 19 is a block diagram illustrating the construction of the image processor 11 which is a modification of the ninth embodiment.

The technique to shift the phase of the carrier signal when the additional data is added to the image data can be realized not only by the construction of FIG. 17, but also by the image processor shown in FIG. 19.

FIG. 19 is a block diagram illustrating the construction of the image processor which is a modification of the ninth embodiment. In FIG. 19, the portions which are identical to those in the eighth and ninth embodiments have the same reference numerals. Only characteristic portions thereof are described below.

In FIG. 19, numeral 2202 is a phase shifter for shifting a phase of the carrier signal which is an output from the carrier signal generator 2110, and more particularly, shifting "+α" to "−α", and "−α" to "+α". Numeral 2203 is a switcher for switching between the carrier signal from the carrier signal generator 2110 and the signal from the phase shifter 2203 in accordance with the additional data, and outputting the selected signal to the adder 2106. The switcher 2203 selects the terminal a when the bit value of the additional data is "1". The carrier signal from the carrier signal generator 2110 is outputted to the adder 2106. The terminal b is selected when the bit value is "0", and the carrier signal on which the phase shift is performed by the phase shifter 2202 is outputted to the adder 2106.

Accordingly, the output of the adder 2106 becomes as shown in FIG. 18 in accordance with the additional data value.

[Tenth Embodiment]

Figure 20:
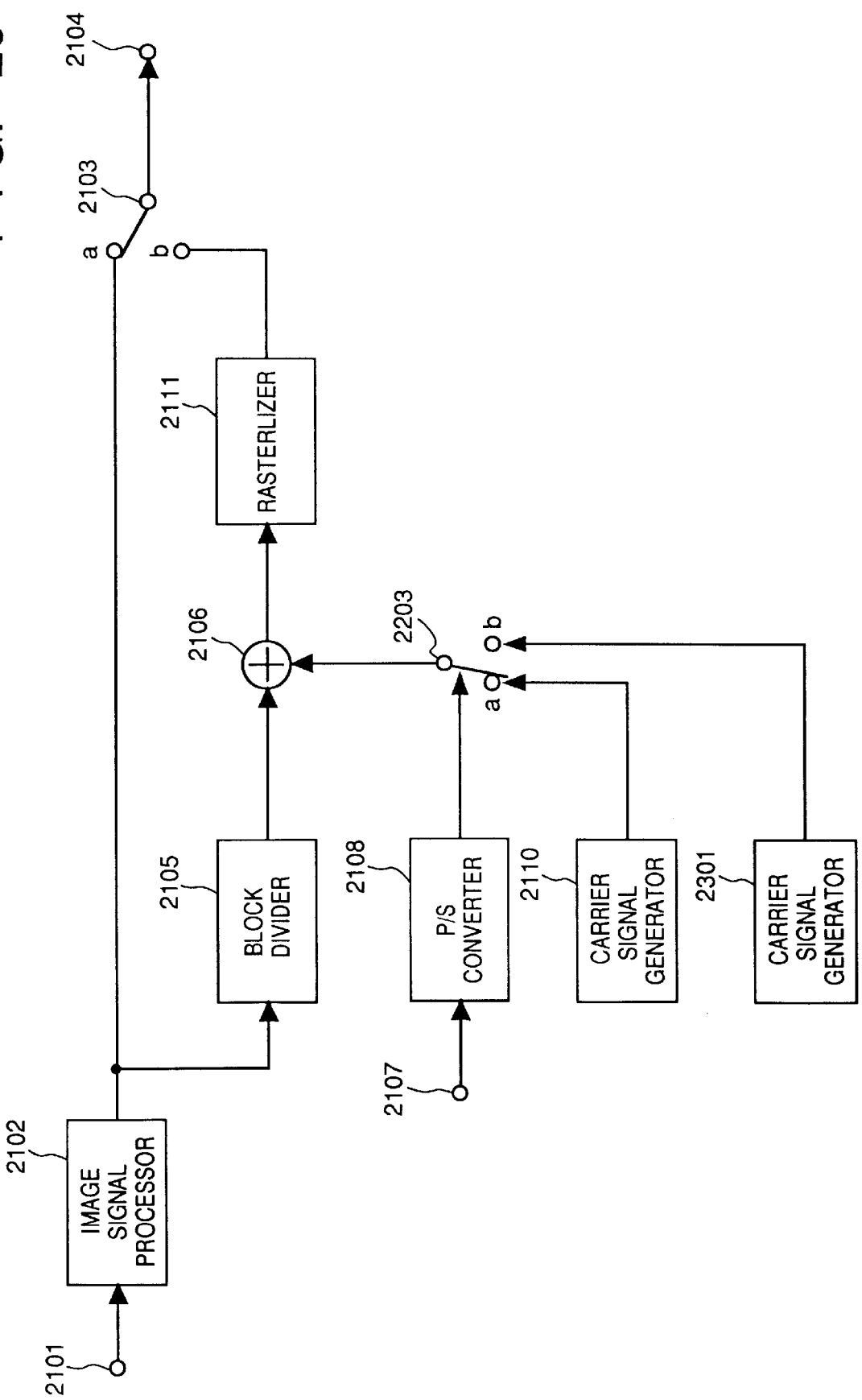
FIG. 20 is a block diagram illustrating the construction of the image processor 11 in accordance with a tenth embodiment.

FIG. 20 is a block diagram illustrating the construction of the image processing unit 11 in accordance with the embodiment. In FIG. 20, the portions which are identical to those in FIG. 17 which describe the eighth and ninth embodiments have the same reference numerals, and the description thereof is not needed here. In FIG. 20, numeral 2301 is a carrier signal generator for generating a carrier signal whose frequency is different from that of the carrier signal generator 2111 used in the eighth and ninth embodiments. The period of the carrier signal from the carrier signal generator 2301 is that of the carrier signal generator 2110 multiplied by an integer.

The characteristic operation in this embodiment is described below.

The switcher 2203 selects the terminal a when the bit value of the additional data is "1", while the terminal b, the bit value is "0". Accordingly, when the bit value is "1", the carrier signal of the carrier signal generator 2110 is added to the original image, while when the bit value is "0", the carrier signal of the carrier signal generator 2301 is added to the original image.

Figure 21:
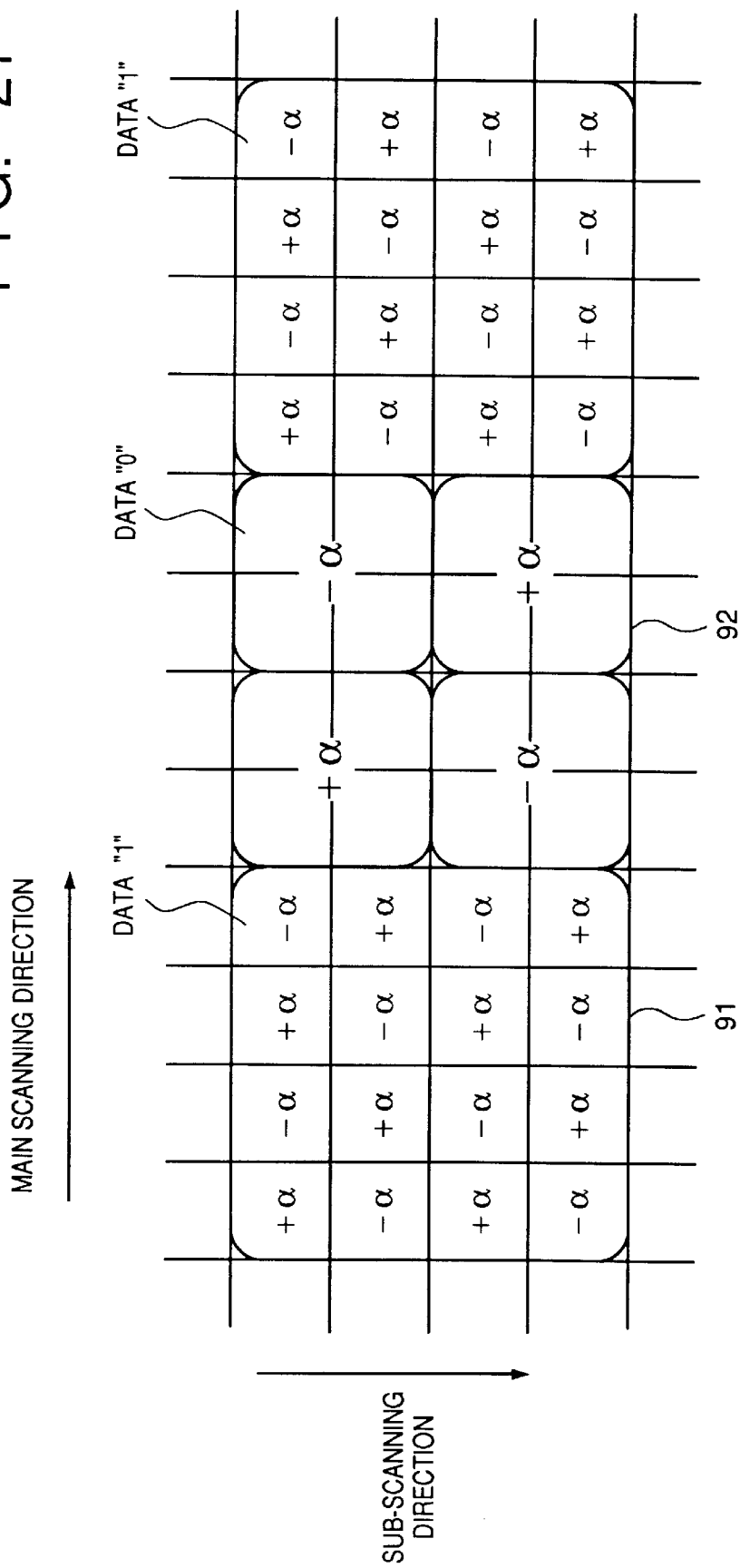
FIG. 21 is a diagram illustrating the adding processing operation of adding additional data in accordance with the tenth embodiment.

The data to which the carrier signal is added by the adder 2106 is as shown in FIG. 21. As is apparent from the blocks 91 and 92 in FIG. 21, the phases of the spatial carrier signals composed of "+α" and "−α" are different from each other for values "0" and "1" of the additional data. The meaning of a grid, the main scanning direction and the sub-scanning direction shown in FIG. 21 are is the same as those in the eighth embodiment.

According to the tenth embodiment, the additional data can be added on the image data by using two carrier signals whose periods are different from each other and switching these carrier signals in accordance with the additional data value. Thus, the additional information can be added to the image data while deterioration of image is suppressed.

In this embodiment, two carrier signal generators are used in order to generate two carrier signals whose frequencies are different from each other. However, this does not impose a limitation upon the invention. For example, as shown in FIG. 22, the same effects can be obtained by providing a single carrier signal generator and a single frequency divider to generate two carrier signals whose frequencies are different from each other.

Figure 22:
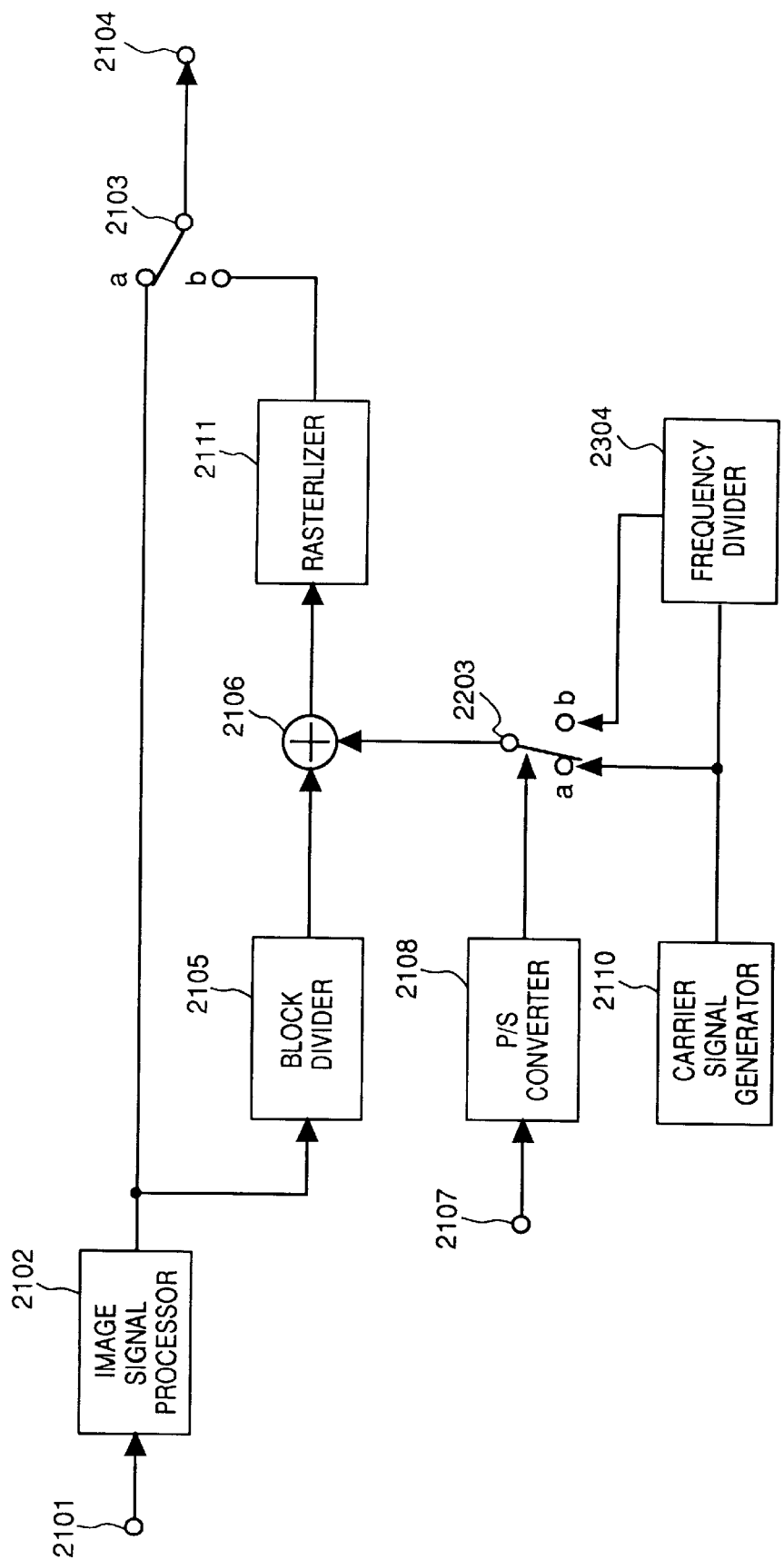
FIG. 22 is a block diagram illustrating the construction of the image processor 11 which is a modification of the tenth embodiment.

FIG. 22 is a block diagram illustrating the construction of the image processor which is a modification of the tenth embodiment. In FIG. 22, the portions which are identical to those in the eighth to tenth embodiment have the same reference numerals. Only the characteristic portions and operation thereof are described below.

In FIG. 22, numeral 2304 is a frequency divider for dividing the carrier signal from the carrier signal generator 2110 and outputting the signal to terminal b of the switcher 2203. The frequency divider 2304 outputs the carrier signal 2203 whose frequency is a multiplication of the period of the carrier signal outputted from the carrier signal generator 2110 by "n" ("n" is an integer).

Furthermore, the two spatial frequencies of the carrier signal are used in the embodiment. However, this does not impose a limitation upon the invention, for two or more than two levels of frequencies can be used. Still further, in the embodiment, as shown in FIG. 21, the frequency of the carrier signal is changed in the main scanning and sub-scanning directions. However, the frequency only in one direction can be changed.

[Eleventh Embodiment (FIGS. 23–25)]

Figure 23:
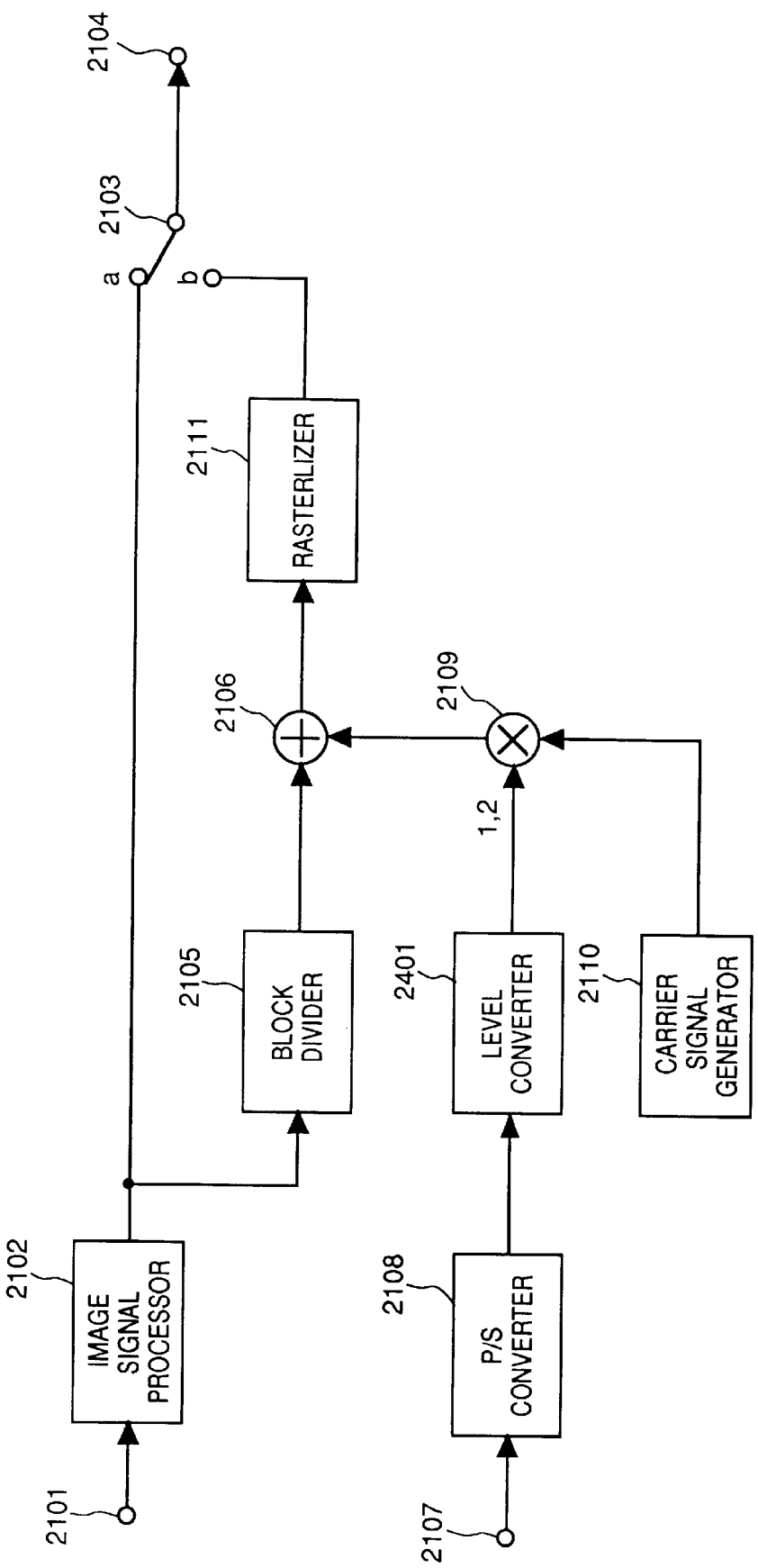
FIG. 23 is a block diagram illustrating the construction of the image processor 11 in accordance with an eleventh embodiment.

FIG. 23 is a diagram illustrating the construction of the image processor 11 in accordance with the embodiment. In FIG. 23, the portions which are identical to those in the eighth embodiment have the same reference numerals, and the description thereof is not needed. In FIG. 23, numeral 2401 is a level converter for inputting a signal from the P/S converter 2108, performing a level conversion (to be described later), and outputting the converted signal to the multiplier 2109.

The characteristic operation in this embodiment is described below.

The level converter 2401 examines each bit of the additional data inputted from the P/S converter 2108, and performs a level conversion so that the output signal value will be "2" when the bit value is "1", while the output signal value will be "1", when the bit value is "0". The converted value is outputted to the multiplier 2109.

Accordingly, when the carrier signal which is similar to that of the eighth embodiment is inputted from the carrier signal generator 2110 and multiplied by the multiplier 2109, the output of the multiplier 2109 is a signal having an amplification which is twice as large as that of the carrier signal from the carrier signal generator 2110, if the additional data value is "1". On the other hand, if the additional data value is "0", the carrier signal from the carrier signal generator 2110 is outputted as it is.

Figure 24:
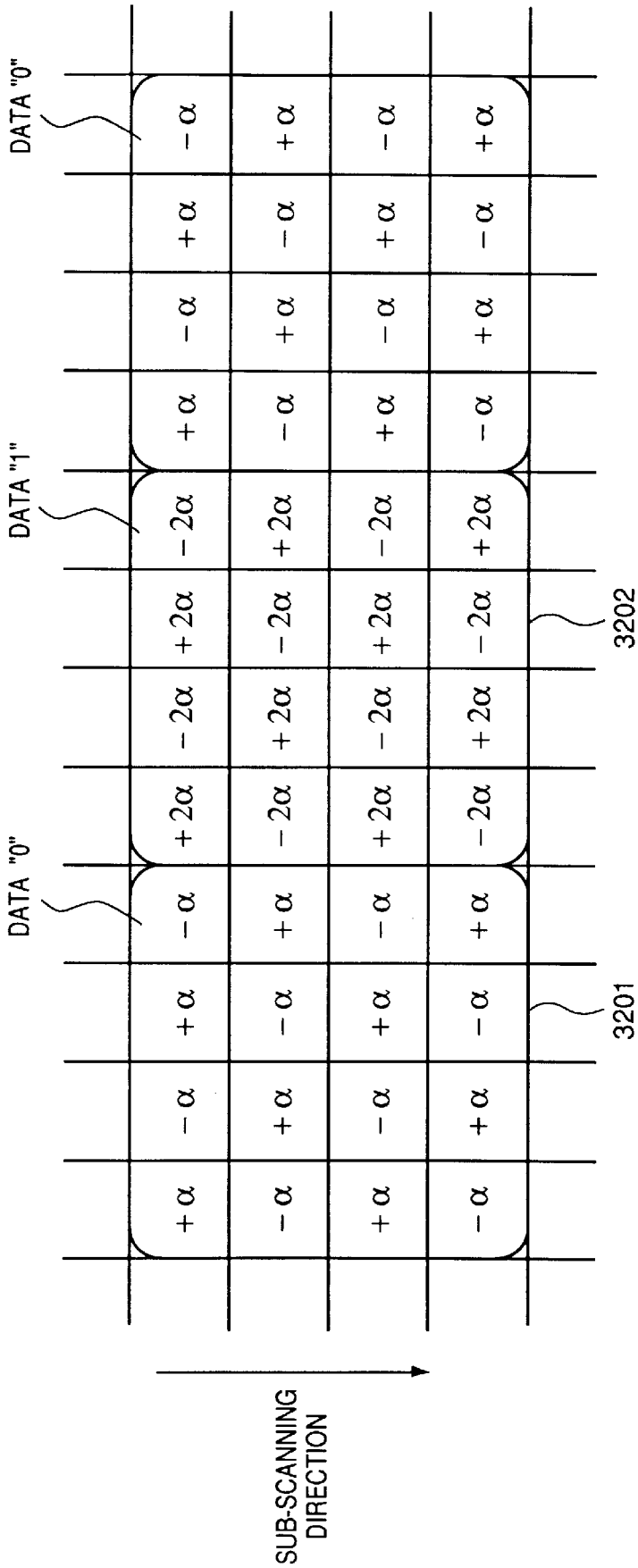
FIG. 24 is a diagram illustrating the adding processing operation of adding the additional data in accordance with the eleventh embodiment.

Accordingly, when the signal outputted from the multiplier 2109 is inputted into the adder 2106, and added to the divided image data, the output result from the adder 2106 is as shown in FIG. 24. In FIG. 24, the block 3201 is an output result obtained when the additional data value is "0", while the block 3202 is an output result obtained when the additional data value is "1". As shown in the figure, when the additional data value is "0", the spatial carrier signal composed of "+α" and "–α" is added to the image data. On the other hand, when the additional data value is "1", the spatial carrier signal composed of "+2α" and "–2α" is added to the image data.

Grids, main scanning direction and sub-scanning direction have the same meaning as that in the eighth embodiment.

In the eighth embodiment, when the additional data value is "0", the original image is outputted as is. On the other hand, according to this embodiment, additional data can be added on an original image by modulating the amplification of the carrier signal from the carrier signal generator 2110 in accordance with the additional data value. Accordingly, the additional information can be added on the image data while deterioration of the image is suppressed.

Furthermore, in the eleventh embodiment, the amplitude of the carrier signal is modulated by the level converter 2401 and adder 2106. However, this does not impose a limitation upon the invention. For example, similar effects as are obtained by the embodiment can be obtained by amplifying the carrier signal outputted from the carrier signal generator 2110 by the amplifier 2403, and switching between the amplified carrier signal and the carrier signal, as shown in FIG. 25.

Figure 25:
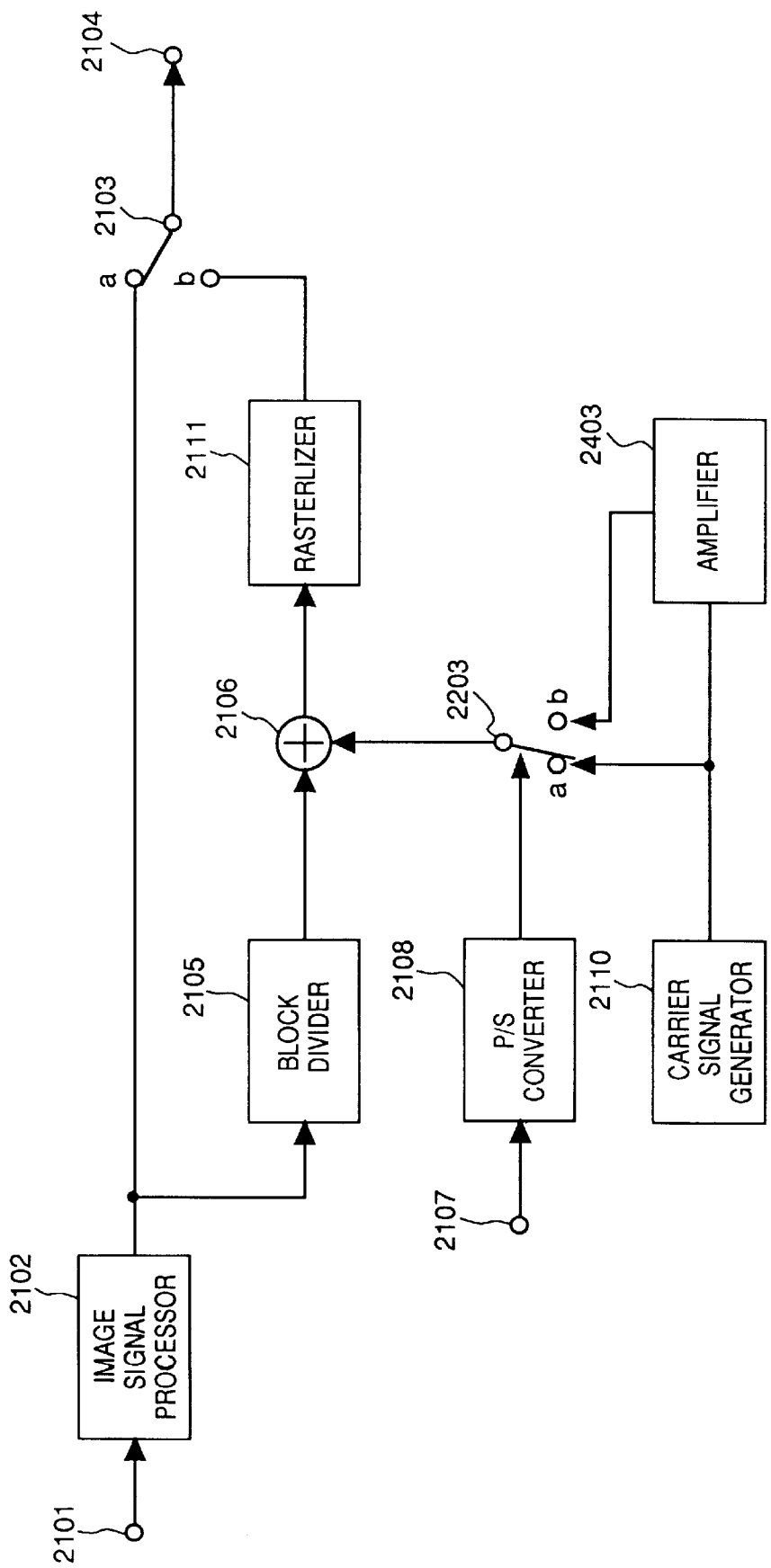
FIG. 25 is a block diagram illustrating the construction of the image processor 11 which is a modification of the eleventh embodiment.

FIG. 25 is a block diagram illustrating the construction of the image processor which is a modification of the eleventh embodiment. In FIG. 25, the portions which are identical to those in the eighth and ninth embodiments have the same reference numerals. Only the characteristic portions thereof are described below.

In FIG. 25, numeral 2403 is the amplifier for amplifying the carrier signal outputted from the carrier signal generator 2110, and more particularly, +α to +2α, and –α to –2α.

In the modification, the amplification of the carrier signal is doubled. However, this does not impose a limitation upon the invention. The value is not limited to binary values, but it can be "n" values ("n" is an integer).

[Twelfth Embodiment (FIGS. 26–28)]

Figure 26:
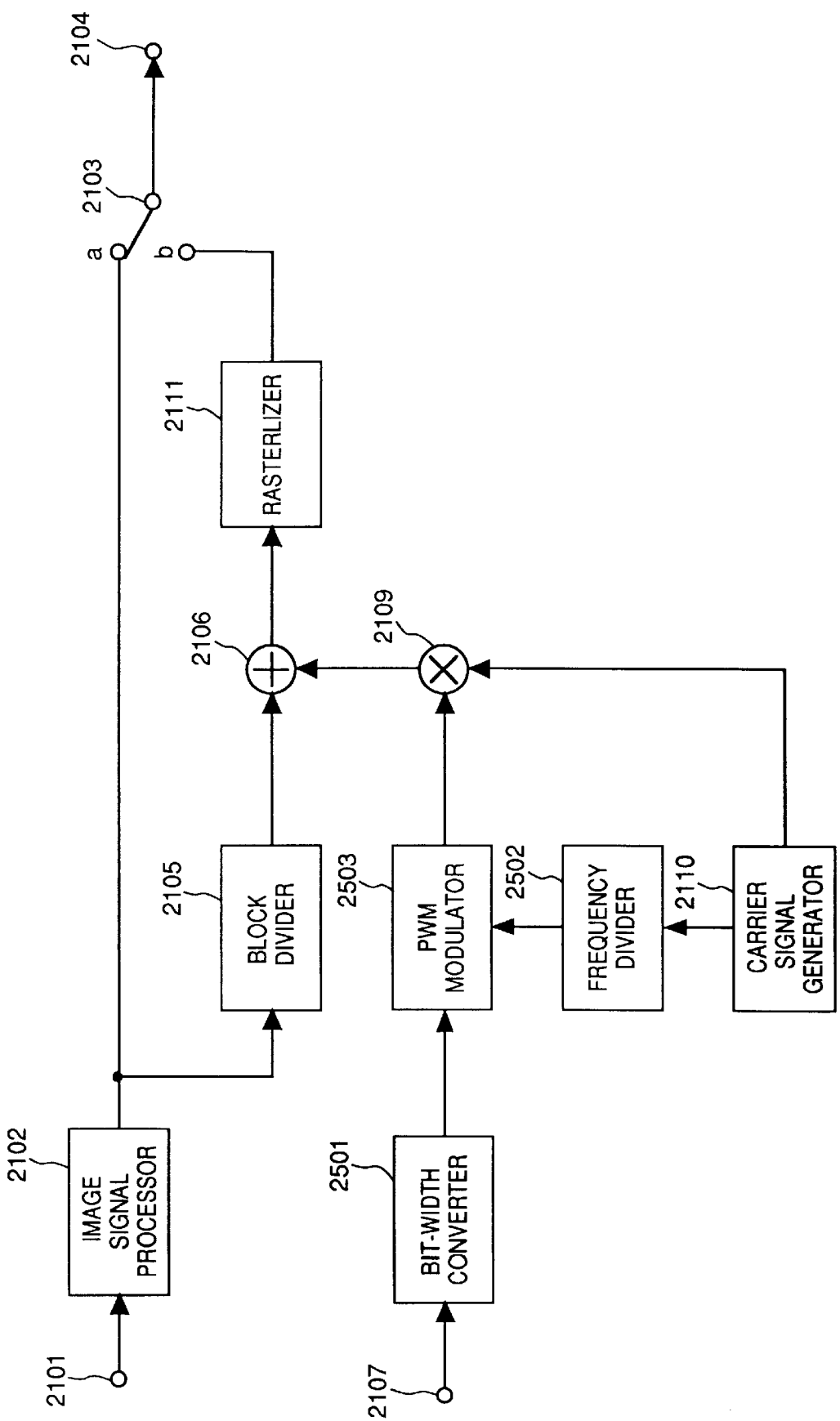
FIG. 26 is a diagram illustrating the image processor 11 according to a twelfth embodiment.

FIG. 26 is a block diagram illustrating the construction of the image processor 11 in accordance with the embodiment. In FIG. 26, the portions which are identical to those in the eighth embodiment have the same reference numerals, and the description thereof is not needed. In FIG. 26, numeral 2501 is a bit-width converter for inputting and outputting the additional data to a PWM modulator 2503, numeral 2502 is a frequency divider for dividing the carrier signal from the carrier signal generator 2110, and numeral 2503 is a PWM modulator for performing the PWM (pulse width modulation) modulation on the divided carrier signal which is an output from the divider 2503 in accordance with the output signal from the bit-width converter 2501.

The characteristic operation in this embodiment is described.

The bit-width converter 2501 adjusts the bit-width of the signal for every entry of two-bit additional data. More particularly, the converter 2501 adjusts a pulse width represented by the two-bit data so that the pulse width represented by the two-bit data coincides with the pulse width represented by four pixel data of the image data inputted via the terminal 2101. Then, the converter 2501 converts the two-bit data to a signal of four levels in accordance with a value (0, 1, 2, or 3) represented by the two-bit data, and then applies it to the PWM modulator 2503. On the other hand, the frequency divider 2502 divides the carrier signal outputted from the carrier signal generator 2110, and outputs a triangular wave corresponding to two bits of the additional data. The PWM modulator 2503 inputs the level signal from the bit-width converter 2501 and the triangular signal from the frequency divider 2502, performs the PWM modulation, and outputs the pulse-modulated signal (the value is "0" or "1") whose pulse width reflects every two-bit input additional data, to the multiplier 2109.

The multiplier 2109 multiplies the carrier signal by the pulse-modulation signal, and the result is outputted to the adder 2106. Accordingly, the output signal of the multiplier 2109 reflects the value of the two-bit input additional data. That is, when the pulse modulation signal is indicating "0", a carrier signal is not outputted. When the pulse modulation signal indicates "1", a carrier signal having the value (the amplification) shown in the first embodiment is outputted.

Figure 27:
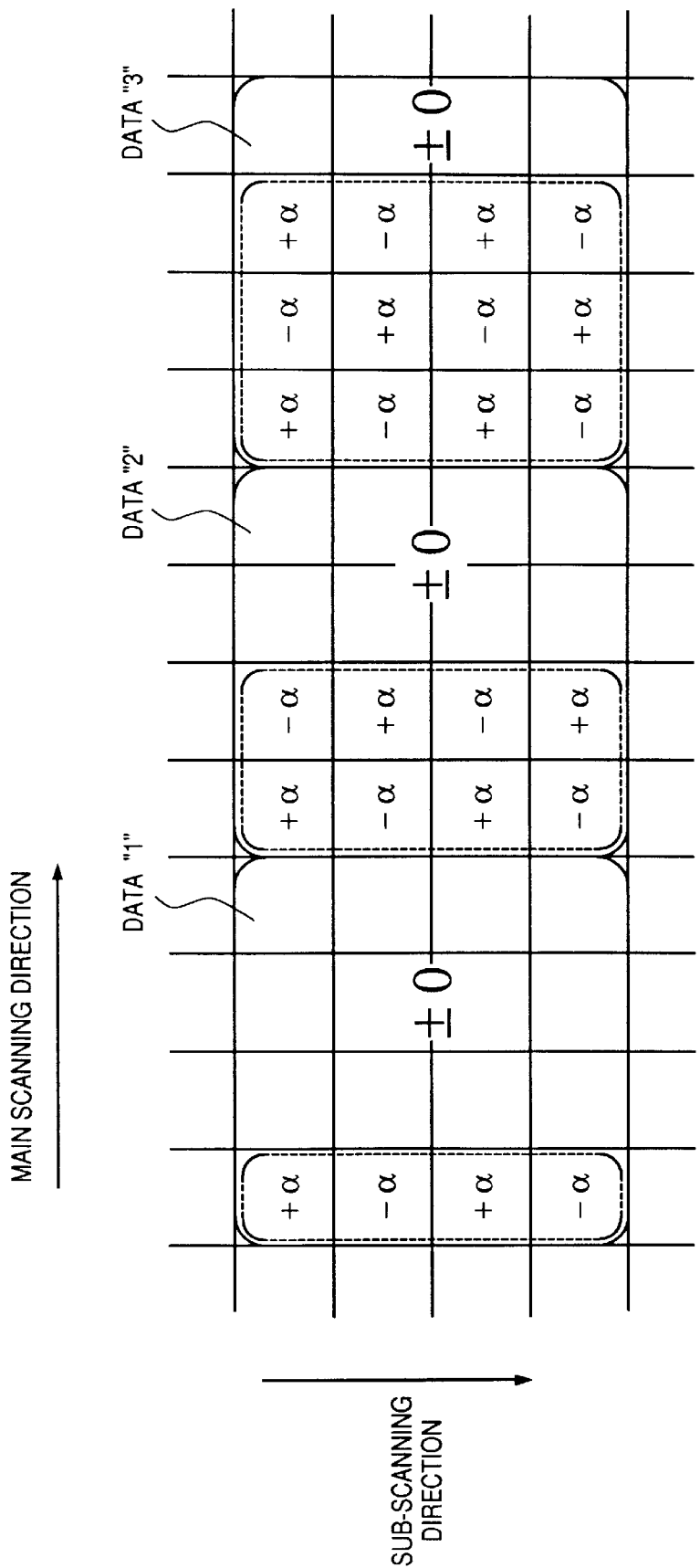
FIG. 27 is a diagram illustrating the adding processing operation of adding the additional data in accordance with a twelfth embodiment.

As a consequence, the image signal outputted from the adder 2106 is subject to the addition where the value for every two bits of the additional data is reflected, and the modulation signal as shown in FIG. 27 is added to each block.

According to the embodiment, as apparent from FIG. 27, the carrier signal from the carrier signal generator 2110 is subject to the area modulation in accordance with the value of the additional data in every two bits so that the area to which the carrier signal is added is modulated on the image of each block. Thus, the additional data is added or multiplexed to the original image. Since the additional data becomes imperceptible to the human eyes, deterioration of the multiplexed image can be suppressed.

Figure 28:
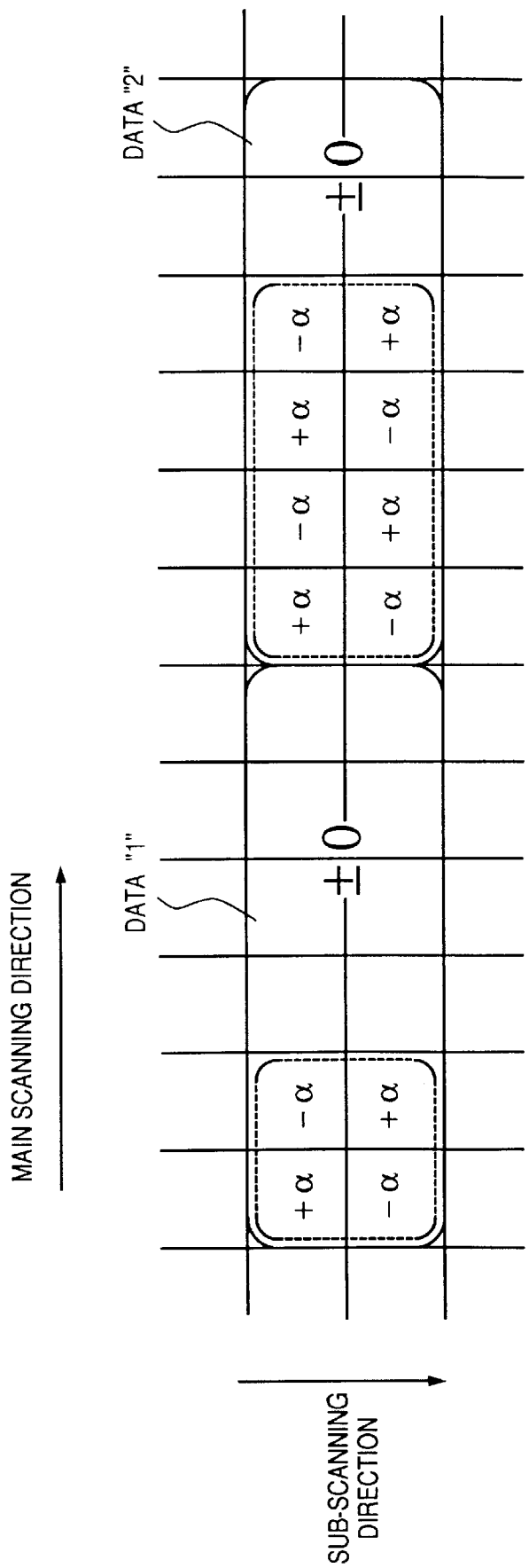
FIG. 28 is a diagram illustrating the adding processing operation of adding the additional data which is a modification of the twelfth embodiment.

In the embodiment as shown in FIG. 27, one block consists of four pixels in the main scanning direction and four pixels in the sub-scanning direction, for a total of 16 pixels. Per unit of 16 pixels, an area modulation is performed so that the value of additional data every two bits can be represented. However, this does not impose a limitation upon the invention. For example, as shown in FIG. 28, one block can consist of 6 pixels in the main scanning direction and 2 pixels in the sub-scanning direction, for a total of 12 pixels. The carrier signal can be added so that the area modulation is performed to express the value of the additional data every two bits.

The method of composing such a block can be determined in consideration with the characteristic of the printer engine described in the eighth embodiment.

Furthermore, in this embodiment, when the value of the additional data every two bits is "0", the original image is outputted. However, this does not impose a limitation upon the invention. For example, a carrier signal can be added by the method described in the second embodiment through the fourth embodiment.

[Thirteenth Embodiment (FIGS. 29–30)]

Figure 29:
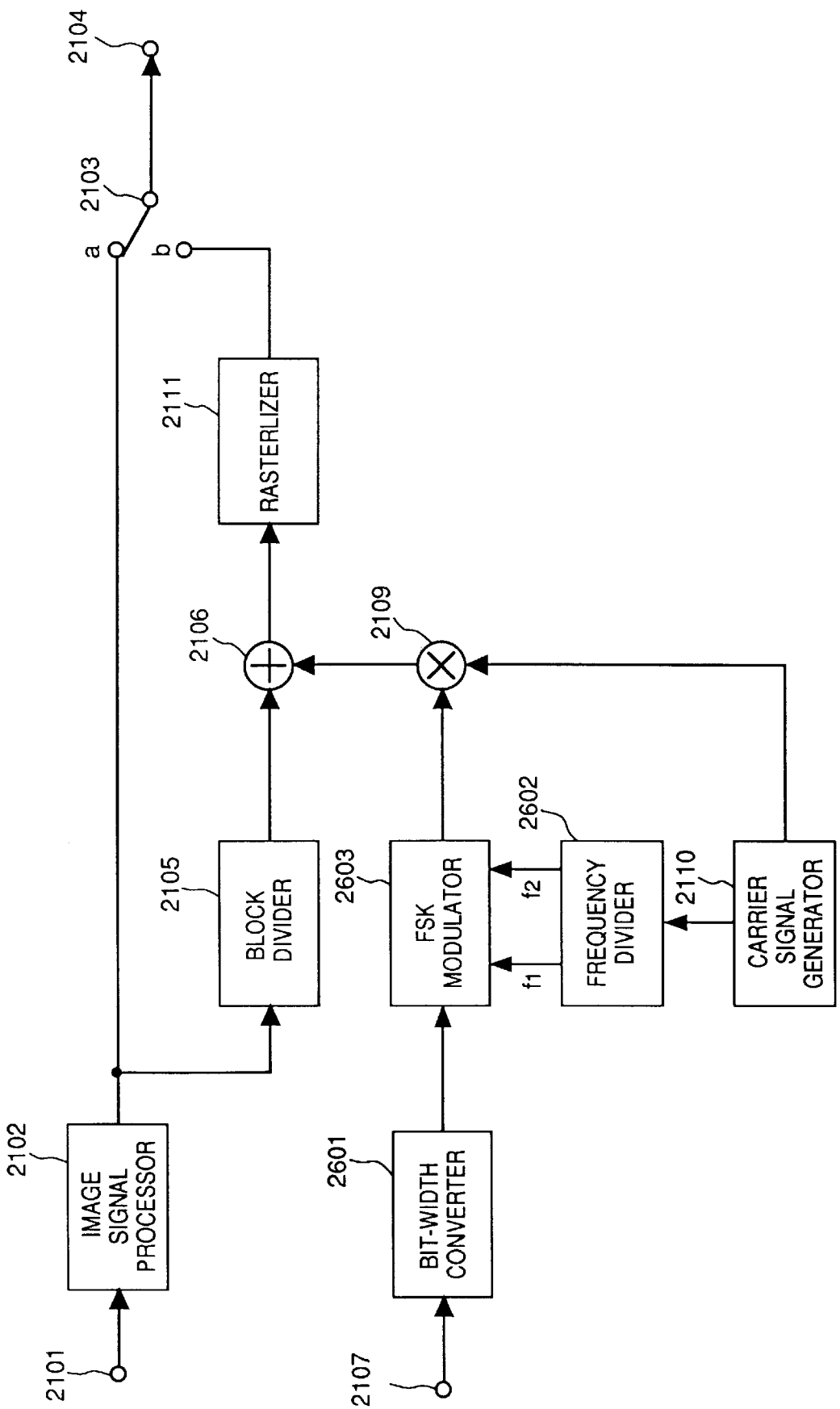
FIG. 29 is a diagram illustrating the image processor 11 in accordance with a thirteenth embodiment.

FIG. 29 is a block diagram illustrating the construction of the image processor 11 in accordance with the embodiment. In FIG. 29, the portions which are identical to those in the eighth embodiment have the same reference numerals, and the description thereof is not needed. In FIG. 29, numeral 2601 is a bit-width converter for inputting and outputting the additional data to an FSK modulator 2603, numeral 2602 is a frequency divider for dividing the carrier signal from the carrier signal generator 2110, and numeral 2603 is an FSK modulator for performing the FSK modulation on the divided carrier signal which is an output from the divider 2603 in accordance with the output signal from the bit-width converter 2601.

The characteristic operation in this embodiment is described below.

The bit-width converter 2601 adjusts the bit width of the input additional data so that the pulse width representing the value (0, 1) of each bit of the input additional data corresponds to a signal width representing 16 pixels of the image data inputted from the input terminal 2101. On the other hand, the frequency divider 2602 divides the carrier signal outputted from the carrier signal generator 2110, and outputs frequency signals ($f_1$ and $f_2$), and outputs them to the FSK modulator 2603. Sixteen pixels of the input image data corresponds to one period interval of the frequency signal ($f_1$) and to two period intervals of the frequency signal ($f_2$) respectively. The FSK modulator 2603 inputs the bit-width converted signal from the bit-width converter 2601 and these two frequency signals from the frequency divider 2602, performs the FSK modulation, and outputs the frequency signal ("$f_1$" or "$f_2$"), to the multiplier 2109, which reflects the value of the two-bit additional data in each bit.

The multiplier 2109 multiplies the carrier signal by the frequency signal, and the result is outputted to the adder 2106. Accordingly, the output signal of the multiplier 2109 which reflects the value of the additional data every in two bits. That is, when the value is "0", the carrier signal is turned on/off at the frequency $f_1$. When the bit value "1", the carrier signal is turned on/off at the frequency $f_2$. As a result, the addition where the value of the additional data in each bit is reflected in every 16 pixels in the main scanning direction is performed on the image signal outputted from the adder 2106, and thus the modulation signal shown in FIG. 30 is added on each block (3801–3893 in FIG. 30).

Figure 30:
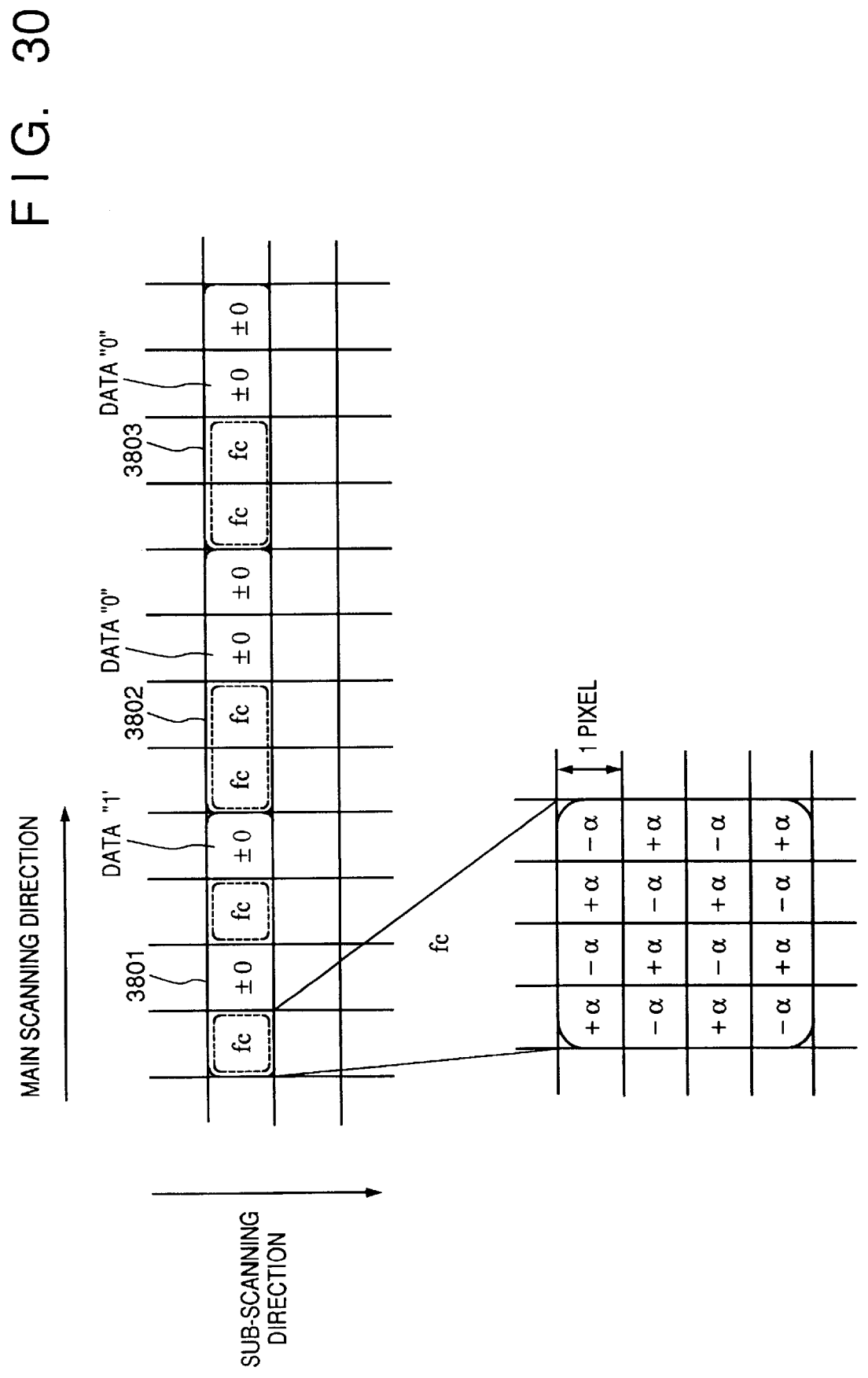

Thus, the embodiment, as apparent from FIG. 30, adds the carrier signal to the original image at the frequency which reflects the additional data value in the main scanning direction.

Furthermore, in the embodiment, the carrier signal is added to the original image at the frequency which reflects the additional data value in the main scanning direction. However, this does not impose a limitation upon the invention. For example, the above adding processing can be performed in the sub-scanning direction or the main/sub-scanning direction.

The method of composing one block can be determined in consideration with the printer engine as described in the eighth embodiment.

[Fourteenth Embodiment (FIGS. 31–32)]

Figure 31:
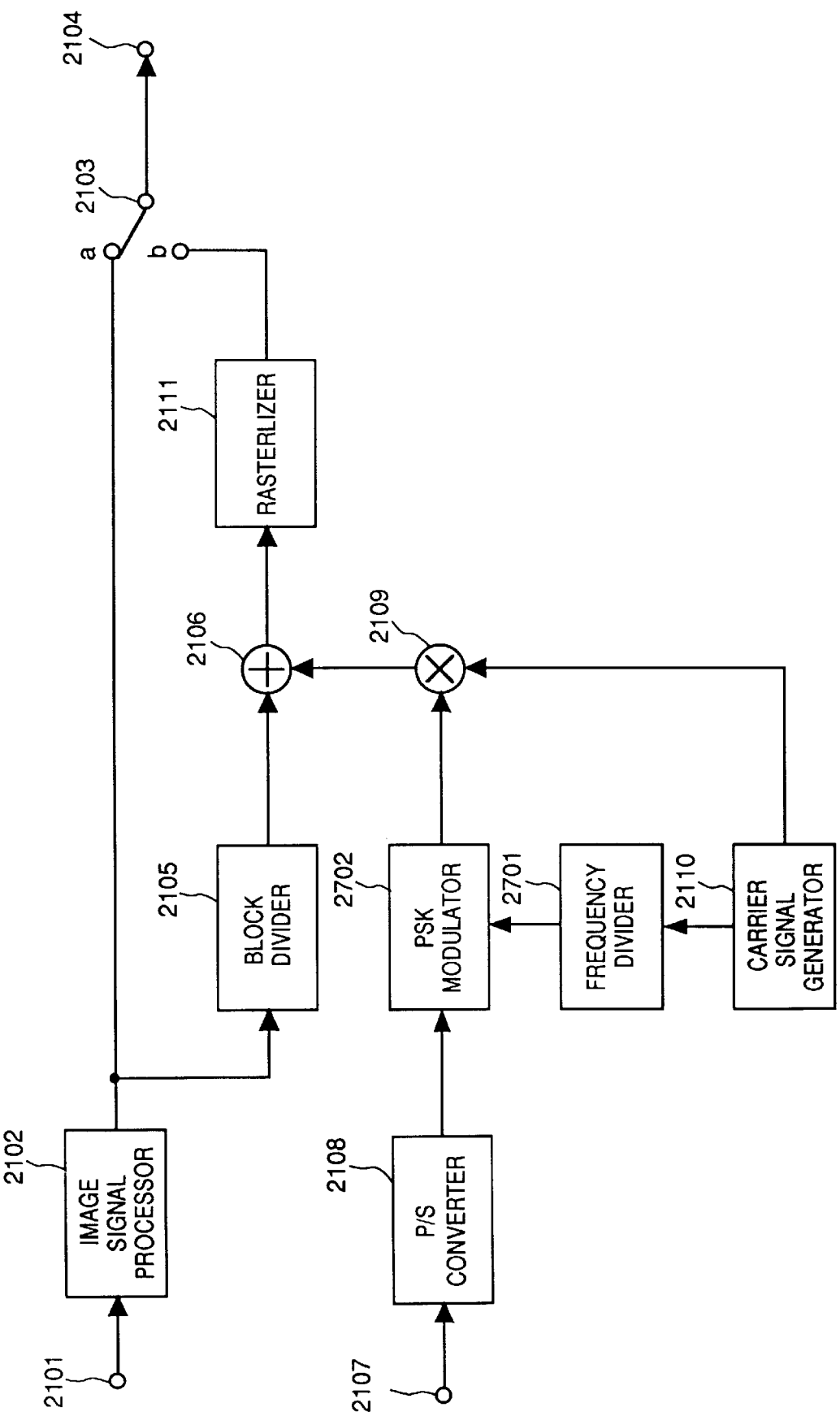
FIG. 31 is a diagram illustrating the construction of an image processor 11 in accordance with a fourteenth embodiment.

FIG. 31 is a block diagram illustrating the construction of the image processor 11 in accordance with the embodiment. In FIG. 31, the portions which are identical to those in the eighth embodiment have the same reference numerals, and the description thereof is omitted. In FIG. 31, numeral 2701 is a frequency divider for dividing the carrier signal from the carrier signal generator 2110, and numeral 2702 is a PSK modulator for performing the PSK modulation on the divided carrier signal which is an output from the divider 2603 in accordance with the output signal from the P/S converter 2108.

The characteristic operation in this embodiment is described below.

The frequency divider 2701 outputs the frequency signal $f_0$ to the PSK modulator 2702. This frequency signal $f_0$, the period interval of which is of eight pixels of the input image data, is obtained by dividing the carrier signal outputted from the carrier signal generator 2110. The PSK modulator 2702 performs the PSK modulation by inputting the bit data from the P/S converter 2108 and the frequency signal from the frequency divider 2701, and outputs the frequency signal whose value of the additional data in each bit is reflected to the phase of the signal to the multiplier 2109.

The multiplier 2109 multiplies the carrier signal by the frequency signal, and outputs the result to the adder 2106. Accordingly, the output signal of the multiplier 2109 becomes a signal which reflects the value of the input data in each bit. That is, when the value is "0", the carrier signal is turned on/off at the frequency $f_0$. When the bit value is "1", the carrier signal is turned on/off at the signal where the phase of the frequency signal $f_0$ is shifted. As a result, the addition which is reflected in the value of the additional data in each bit in every 8 pixels in the main scanning direction is performed on the image signal outputted from the adder 2106, and thus the modulation signal shown in FIG. 20 is added on each block (4001–4006 in FIG. 32).

Figure 32:
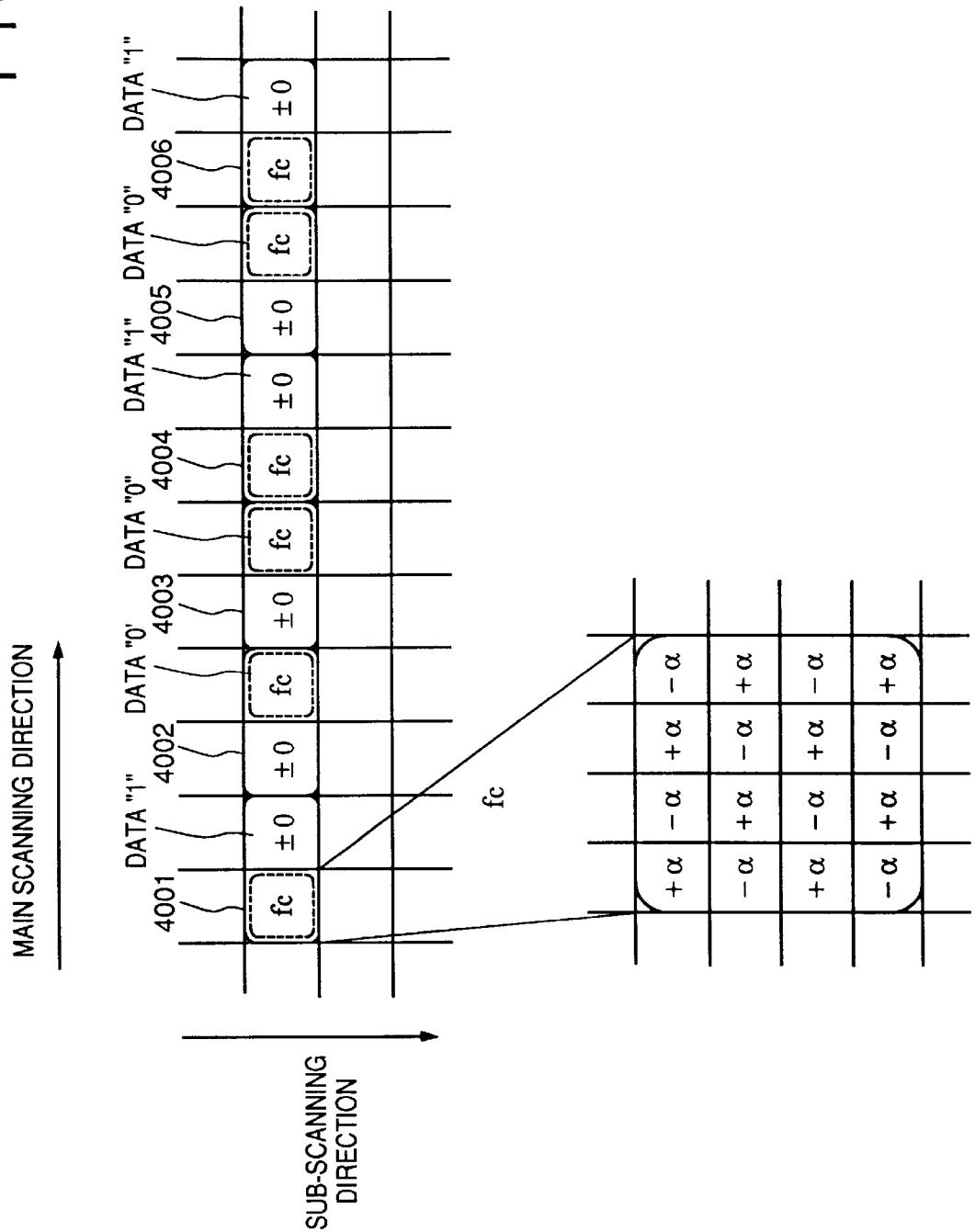
FIG. 32 is a diagram illustrating the construction of the additional data in accordance with the fourteenth embodiment.

According to the embodiment, as apparent from FIG. 32, in the addition process of the additional data, the carrier signal can be added to the original image at the phase which reflects the additional data value in the main scanning direction.

Furthermore, in the embodiment, the carrier signal is added to the original image at the frequency which reflects the additional data value in the main scanning direction. However, this does not impose a limitation upon the invention. For example, the above adding processing can be performed in the sub-scanning direction or both in the main/sub-scanning directions.

The method of composing one block can be determined in consideration with the printer engine as described in the eighth embodiment.

[Fifteenth Embodiment (FIGS. 33–34)]

Figure 33:
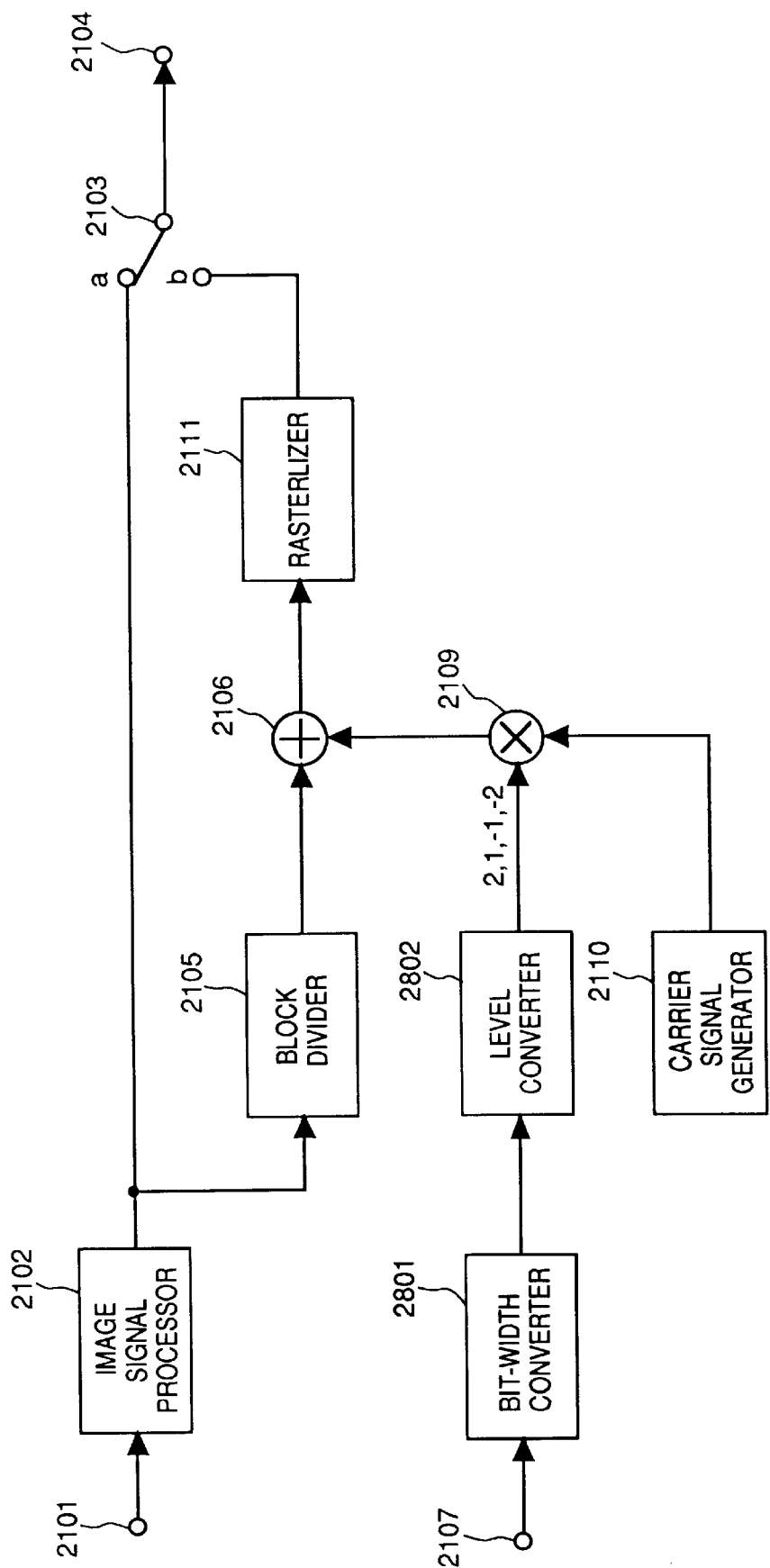
FIG. 33 is a diagram illustrating the construction of an image processor 11 in accordance with a fifteenth embodiment.

FIG. 33 is a block diagram illustrating the construction of the image processor 11 in accordance with the embodiment. In FIG. 33, the portions which are identical to those in the eighth embodiment have the same reference numerals, and the description thereof is omitted. In FIG. 33, numeral 2801 is a bit-width converter for inputting the additional data, performing the conversion processing to be described later, and outputting the converted signal to a level converter 2802, numeral 2802 being a level converter for converting the output signal from the bit-width converter 2801.

The characteristic operation in this embodiment is described below.

The bit-width converter 2801 converts the bit width so that the signal pulse width representing the value of each bit (0, 1) of the input additional data corresponds to the signal width representing two pixels of the image data inputted from the input terminal 2101. On the other hand, the level converter 2801 converts the signal to a four-level signal (1, −1, 2, −2) in accordance with the value (0, 1, 2, 3) represented by the 2-bit data, and outputs the converted signal to the multiplier 2109.

The multiplier 2109 multiplies the carrier signal by the level-converted signal, and the result is outputted to the adder 2106. Accordingly, the output signal of the multiplier 2109 becomes a signal which reflects the value of the additional data every in two bits. That is, when the value indicated by the 2-bit data is "0", "1", "2" and "3", each of the output signal of the multiplier 2109 is a carrier signal, an inverted carrier signal, a carrier signal having a doubled amplification and an inverted signal having a doubled amplification, respectively.

Figure 34:
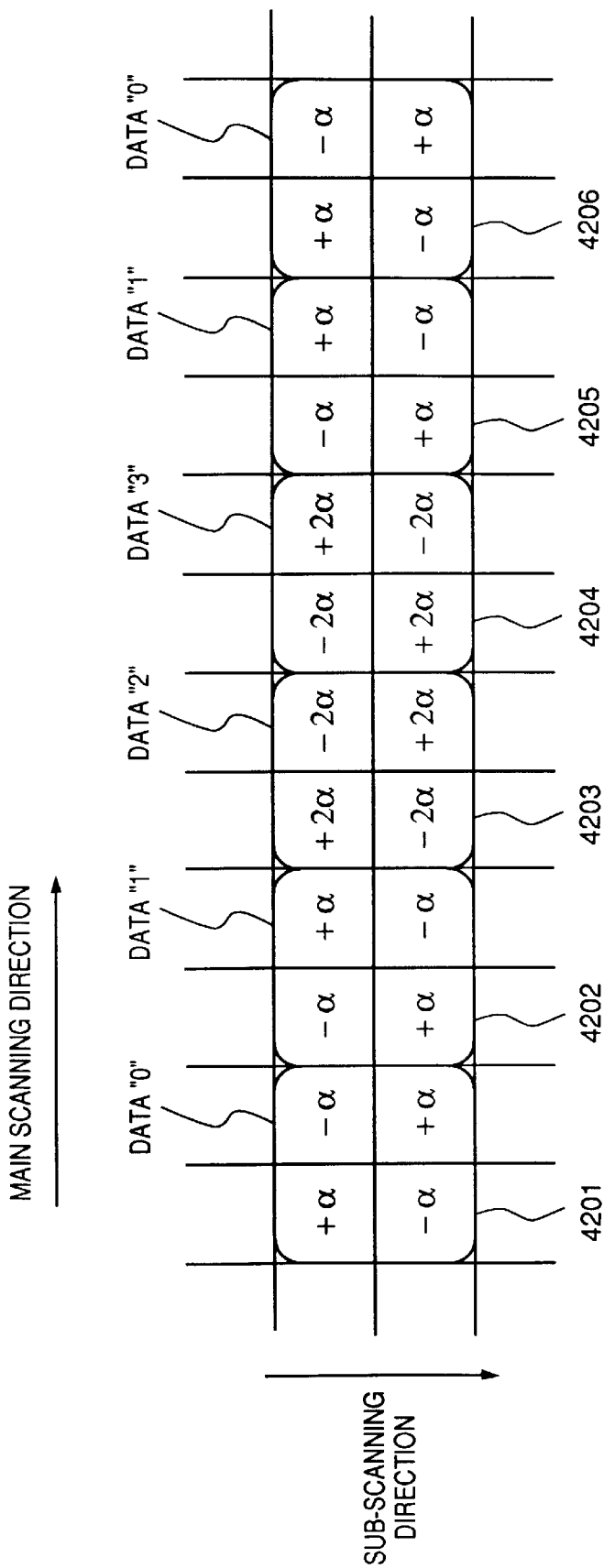
FIG. 34 is a diagram illustrating the adding of the additional data in accordance with the fifteenth embodiment.

As a consequence, the image signal outputted from the adder 2106 is subject to the addition which reflects the value of the additional data in every two bits, and the modulation signal as shown in FIG. 34 is added to each block (4201–4206 of FIG. 34).

According to the embodiment, as apparent from FIG. 34, the carrier signal from the carrier signal generator 2110 is subject to the area modulation in accordance with the value of the additional data in every two bits so that the area to which the carrier signal is added is modulated on the image of each block. Thus, the additional data is added to the original image. Accordingly, since the additional data becomes imperceptible, deterioration of the image including the additional information can be suppressed.

The method of composing such a block can be determined in consideration with the characteristic of the printer engine described in the eighth embodiment.

[Sixteenth Embodiment (FIGS. 35–36)]

Figure 35:
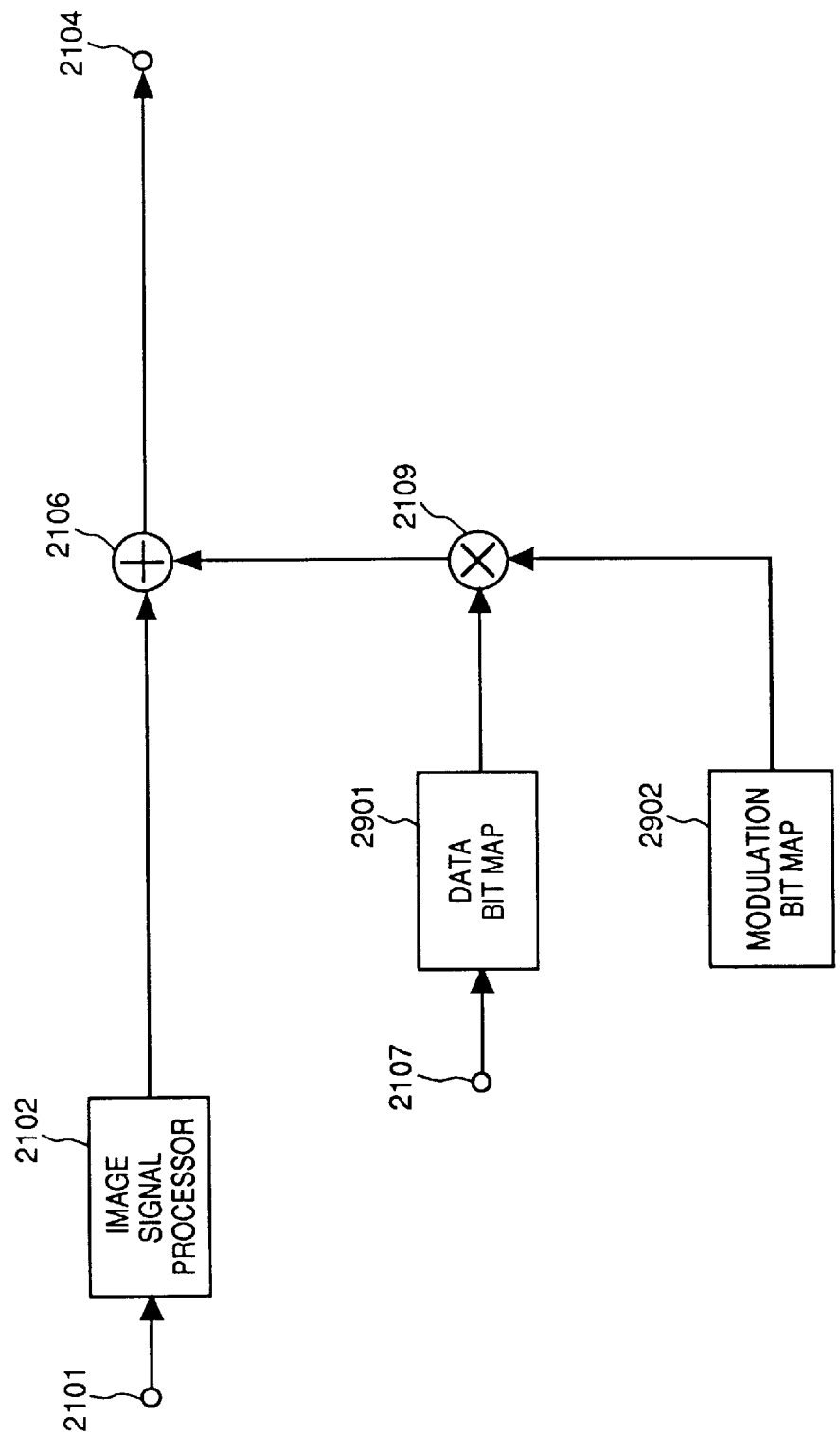
FIG. 35 is a diagram illustrating the construction of an image processor 11 in accordance with a sixteenth embodiment.

FIG. 35 is a block diagram illustrating the image processor 11 in accordance with the embodiment. In FIG. 35, the portions which are identical to those in the eighth embodiment have the same reference numerals, and the description thereof is omitted. In FIG. 35, numeral 2901 is a data bit map for temporary storing the bit pattern to which each bit value of the additional data is reflected, and numeral 2902 is a modulation bit map for storing the bit pattern which is a primary data in order to modulate the additional data.

The characteristic operation of the embodiment is described with reference to FIG. 36.

The modulation bit map 2902 stores a bit pattern having a predetermined frequency which is modulation data to add the additional data to the image data. On the other hand, the data bit map stores the bit pattern to which the value is reflected in accordance with the bit value of the additional data. These two data are multiplied in the multiplier 2109, and the result is outputted to the adder 2106.

Figure 36:
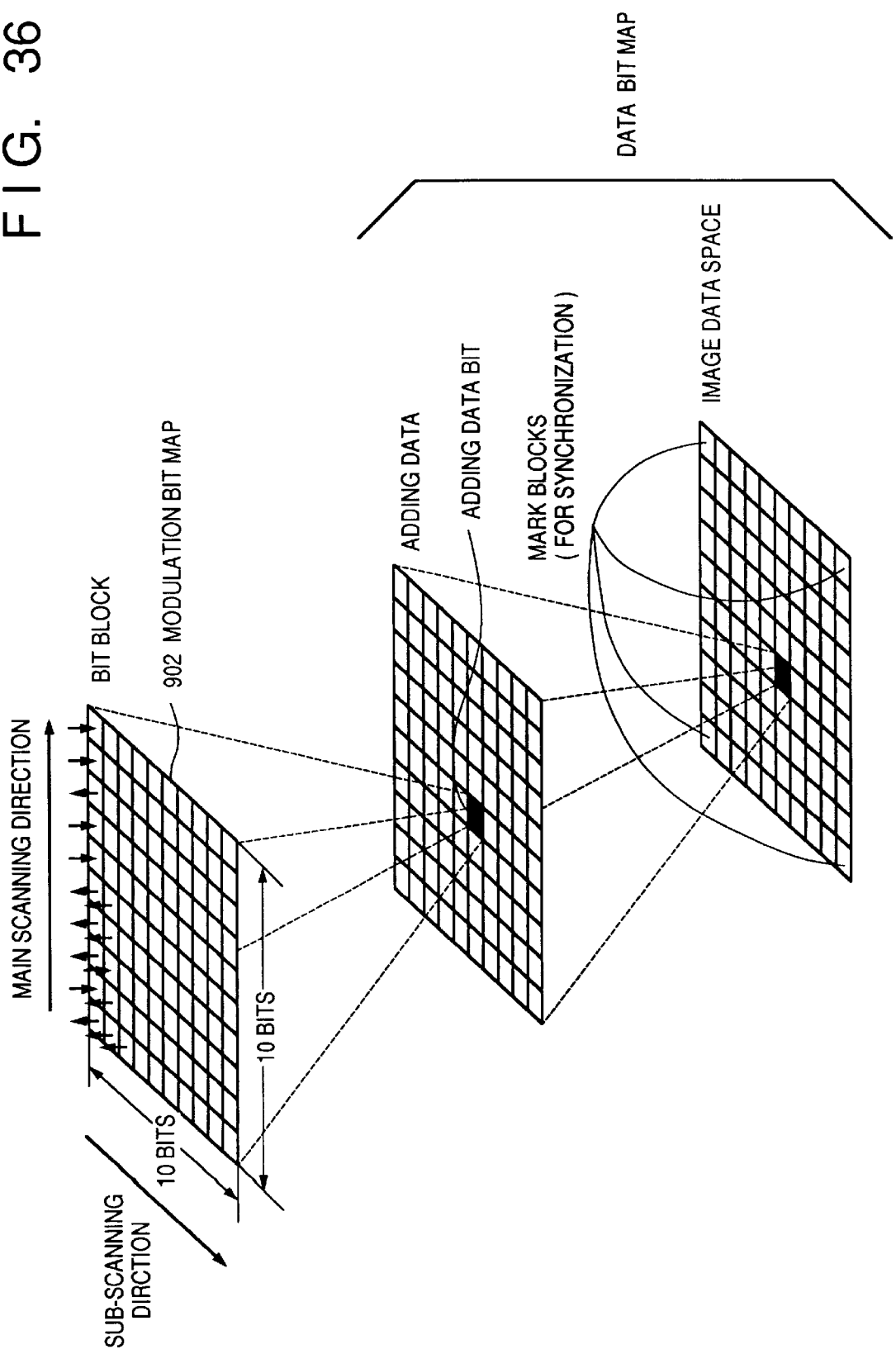
FIG. 36 is a diagram illustrating the adding of the adding data in accordance with the sixteenth embodiment.

Accordingly, if the scheme described in the eighth embodiment is applied here and it is assumed that the bit pattern, the modulation data, is represented by 10 bits×10 bits, as shown in FIG. 36, the bit pattern is directly outputted to the adder 2106, in the case of the bit value "1". In the case of the bit value "0", the bit pattern in which bits are respectively "0" is outputted to the adder 2106. The output pattern to which the value of the addition data is reflected is not restricted to this embodiment. For example, if the bit value is "0", the inverted pattern of the output pattern when the bit value is "1" can be used.

Furthermore, in the multiplexing operation of the image data in the adder 2106, as shown in FIG. 36, a mark block having a predetermined pixel value is added to the image data in a predetermined interval in the main scanning direction and the sub-scanning direction so that the additional data can be easily detected when the image data is decoded.

Accordingly, the information indicated by the additional data and the mark blocks can be added to the overall original image by repeating the above-described processing in the main scanning direction and the sub-scanning direction.

As described above, according to this embodiment, since the additional data is imperceptible, even though the additional data is added to the image data, the additional information can be added to the image data, while deterioration of the image including the additional information is suppressed.

In the above embodiments, a printer apparatus which outputs the image information including the additional data is described. However, the printer apparatus can be a printer which uses an arbitrary scheme of a laser beam printer, an ink-jet printer, a thermal-transfer printer or a bubble-jet printer having a type of head which discharges ink droplets by utilizing film-boiling controlled by thermal energy.

Furthermore, in the above-described embodiments, the image output unit for outputting the image information including the additional data is a printer engine. However, this does not impose a limitation upon the invention, for a still-video camera, and various VTRs and a recording/transmitting apparatus can be the output apparatus.

Still further, the additional information is not restricted to the embodiments disclosed. For example, in the case of a full-color printer, the serial number of a printing apparatus or printed data will be effective in order to prevent forgery of securities or bank notes. In the case of still video, a date, the name of a place, and a comment can be added to an original image.

The present invention can be applied to a system constituted by a plurality of devices such as an image scanner, a host computer, etc., or to an apparatus comprising a single device such as a copy machine. Furthermore, it goes without saying that the invention is applicable also to a case where the object of the invention is attained by supplying a program stored in a medium to a system or apparatus.

As described above, according to the invention, the additional information is modulated by a predetermined carrier signal, and the modulation amount is added to the image data in the unit of plural pixels of the image data in consideration of the number of tones capable of expressing image data. Accordingly, the additional information can be added to the image, while deterioration of the image can be avoided. Furthermore, since the modulation amount is small, high confidentiality of the adding information is provided so that a third person will not notice the added information. Still further, the additional information can be decoded from an arbitrary area by adding the additional information over all of the image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   first generating means for generating first image data representing an original;
   second generating means for generating second image data representing additional information;
   converting means for converting a spectrum characteristic of the second image data in a frequency space using a reference signal; and
   synthesizing means for synthesizing the converted second image data with the first image data.

2. The apparatus according to claim 1, wherein said converting means converts the spectrum characteristic of the additional information by multiplying a pseudo noise sequence which has a strong self-correlation by the additional information.

3. The apparatus according to claim 1, further comprising:
   means for changing a frequency of the converted image data.

4. The apparatus according to claim 1, further comprising:
   means for changing a phase of the converted second image data.

5. The apparatus according to claim 1, further comprising:
   means for amplifying an amplitude of the converted second image data.

6. An image processing method comprising:
   a first generating step of generating image data representing an original image;
   a second generating step of generating additional data representing predetermined additional information;
   a converting step of converting a spectrum characteristic of the additional data in a frequency space;
   a synthesizing step of synthesizing the image data generated in said first generating step, and the converted additional data converted in said converting step; and
   an image forming step of forming an image on the basis of the image data in the frequency space generated by said synthesizing means.

7. An image processing method comprising the steps of:
   generating first image data representing an original;
   generating second image data representing additional information;
   converting a spectrum characteristic of the second image data in a frequency space using a reference signal; and
   synthesizing the converted second image data with the first image data.

8. An image processing apparatus comprising:
   first generating means for generating image data representing an original image;
   second generating means for generating additional data representing predetermined additional information;
   converting means for converting a spectrum characteristic of the additional data in a frequency space; and
   synthesizing means for synthesizing the image data generated by said first generating means, and the converted additional data converted by said converting means.

9. An image processing apparatus according to claim 8, wherein an image generated by said synthesizing means substantially represents the original image.

10. An image processing method comprising:
    a first generating step of generating image data representing an original image;
    a second generating step of generating additional data representing predetermined additional information;
    a converting step of converting a spectrum characteristic of the additional data in a frequency space; and
    a synthesizing step of synthesizing the image data generated in said first generating step, and the converted additional data converted in said converting step.

11. An image processing apparatus comprising:
    first generating means for generating image data representing an original image;
    second generating means for generating additional data representing predetermined additional information;
    converting means for converting a spectrum characteristic of the additional data in a frequency space;
    synthesizing means for synthesizing the image data generated by said first generating means and the converted additional data; and
    image forming means for forming an image on the basis of the image data in the frequency space generated by said synthesizing means.

12. An image processing apparatus according to claim 11, wherein an image generated by said synthesizing means substantially represents the original image.

* * * * *

UNITED STATES PATENT AND TRADEMARK OFFICE
CERTIFICATE OF CORRECTION

PATENT NO. : 5,857,038

DATED : January 5, 1999

INVENTOR(S): MITSURU OWADA, ET AL.

It is certified that error appears in the above-identified patent and that said Letters Patent is hereby corrected as shown below:

COLUMN 4

Line 7, "an" should be deleted.

COLUMN 5

Line 12, "produces" should read --produce--.
    Line 31, "of" should be deleted.

COLUMN 9

Line 2, "pre-processing" should read --pre-processing operations--.
    Line 45, "an" should read --a--.

COLUMN 11

Line 46, "will" should read --will be--.

COLUMN 14

Line 8, "strucures" should read --structures--.

UNITED STATES PATENT AND TRADEMARK OFFICE
CERTIFICATE OF CORRECTION

PATENT NO. : 5,857,038

DATED : January 5, 1999

INVENTOR(S) : MITSURU OWADA, ET AL.

It is certified that error appears in the above-identified patent and that said Letters Patent is hereby corrected as shown below:

COLUMN 18

Line 36, "are is" should read --is--.

COLUMN 19

Line 45, "main scanning direction and" should read --the scanning direction and the--.

COLUMN 21

Line 61, "which" should be deleted and "every in" should read --in every--.

COLUMN 22

Line 55, "as" should read --as is--.

COLUMN 23

Line 41, "as" should read --as is--.
   Line 44, "in two" should read --two--.

UNITED STATES PATENT AND TRADEMARK OFFICE
CERTIFICATE OF CORRECTION

PATENT NO. : 5,857,038

DATED : January 5, 1999

INVENTOR(S) : MITSURU OWADA, ET AL.

It is certified that error appears in the above-identified patent and that said Letters Patent is hereby corrected as shown below:

<u>COLUMN 24</u>

Line 51, "bank notes." should read --banknotes.--.

Signed and Sealed this

Seventh Day of November, 2000

Attest:

Q. TODD DICKINSON

*Attesting Officer*      *Director of Patents and Trademarks*